United States Patent [19]

Abe et al.

[11] Patent Number: 4,914,602

[45] Date of Patent: Apr. 3, 1990

[54] METHOD FOR DETECTING THE MOLDING DEFECTIVENESS OF A PRESS-MOLDED WORKPIECE AND A TERMINAL PRESS-BONDING APPARATUS UTILIZING THE SAME

[75] Inventors: Fumihiko Abe, Chiba; Yoshio Yamamoto; Shizuka Yamaguchi, both of Ichihara, all of Japan

[73] Assignee: Furukawa Electric Co., Ltd., Tokyo, Japan

[21] Appl. No.: 190,101

[22] Filed: May 4, 1988

[30] Foreign Application Priority Data

| | | | |
|---|---|---|---|
| May 13, 1987 | [JP] | Japan | 62-114423 |
| May 13, 1987 | [JP] | Japan | 62-114424 |
| Dec. 30, 1987 | [JP] | Japan | 62-333807 |
| Dec. 30, 1987 | [JP] | Japan | 62-333808 |
| Jan. 21, 1988 | [JP] | Japan | 63-11177 |

[51] Int. Cl.[4] ........................ H01R 43/48; G06F 15/46

[52] U.S. Cl. .................................... 364/507; 140/105; 73/788; 73/804; 72/3; 29/863; 364/472; 364/552; 364/476

[58] Field of Search ............... 364/472, 476, 552, 558, 364/507, 550.01, 508; 73/781, 788, 791, 804, 8; 72/1, 3, 4, 8, 19, 20; 29/883, 884, 863; 264/272.11, 275, 277; 140/105, 106; 382/8

[56] References Cited

U.S. PATENT DOCUMENTS

| | | | |
|---|---|---|---|
| 4,107,981 | 8/1978 | Kanagawa et al. | 73/804 X |
| 4,348,806 | 9/1982 | Eves et al. | 29/863 |
| 4,398,337 | 8/1983 | Yamaguti et al. | 29/863 X |
| 4,443,936 | 4/1984 | Lazaro, Jr. | 29/863 |
| 4,555,799 | 11/1985 | Kodama et al. | 382/8 |
| 4,580,224 | 4/1986 | Gerber | 364/472 |
| 4,606,205 | 8/1986 | Segredo et al. | 72/19 |
| 4,653,300 | 3/1987 | Crout et al. | 72/20 X |
| 4,723,429 | 2/1988 | Weber et al. | 72/8 X |

FOREIGN PATENT DOCUMENTS

| | | |
|---|---|---|
| 60-246579 | 12/1985 | Japan . |
| 61-161404 | 7/1986 | Japan . |
| 61-165645 | 7/1986 | Japan . |

*Primary Examiner*—Parshotam S. Lall
*Assistant Examiner*—Joseph L. Dixon
*Attorney, Agent, or Firm*—Frishauf, Holtz, Goodman & Woodward

[57] ABSTRACT

A method of press-molding defectiveness detection adapted for the detection of the press-bonding defectiveness of an terminal which is attached to the end of a covered wire so that a wire barrel and an insulation barrel of the terminal are press-bonded to a conductor portion at the end of the covered wire and a covered portion of the wire, respectively, by press-molding. A profile of a press-bonding load acting on the terminal during terminal press-bonding operation is detected, and the press-bonding defectiveness of the terminal is determined by comparing the detected press-bonding load profile with a reference press-bonding load profile. The press-bonding defectiveness of the terminal may be determined, as required, by comparing the integral value of the press-bonding load, calculated on the basis of the detected press-bonding load profile, with a predetermined reference value. Alternatively, the defectiveness may be determined by comparing a press-bonding load value at at least one point of time and the maximum press-bonding load value with predetermined reference values individually corresponding thereto. Preferably, the press-bonding defectiveness of the terminal is determined by separately detecting profiles of press-bonding loads acting on the wire barrel and the insulation barrel, and comparing these profiles with reference press-bonding load profiles individually corresponding thereto.

25 Claims, 17 Drawing Sheets

METHOD FOR DETECTING THE MOLDING DEFECTIVENESS OF A PRESS-MOLDED WORKPIECE AND A TERMINAL PRESS-BONDING APPARATUS UTILIZING THE SAME

BACKGROUND OF THE INVENTION

The present invention relates to a method for detecting the molding defectiveness of a press-molded workpiece, and more particularly, to a molding defectiveness detecting method adapted for press-molding work, such as terminal press-bonding of electric wires, press-fit of heat exchanger pipes in support plates, lid grooving in the end faces of cans for beer and the like, deep press-drawing, press-marking, press-stamping, etc., and a terminal press-bonding apparatus utilizing the aforesaid method.

In attaching a press-bonded terminal to the end of a covered wire by press-molding, for example, a covering portion of a certain length is stripped from the end of a cut wire piece of a predetermined length, a wire barrel of the terminal, having a predetermined shape and dimensions, is press-bonded to a conductor portion (core portion) at the wire end, and an insulation barrel of the terminal is press-bonded to an insulating-resin-coated portion at the wire end. Some of a number of such press-bonded terminals mounted in this manner may be subject to press-bonding defectiveness at their core portion or resin-coated portion.

In these defective terminals, some of cores of the wire may be left outside the wire barrel ("split-cored"), the core portion may be wrongly seized by the insulation barrel ("sunk-cored"), or the covered portion of the wire may be seized by the wire barrel ("resin-engaged"), for example.

As a method for detecting such terminal press-bonding defectiveness, a method disclosed in Japanese Patent Disclosure No. 60-246,579 is conventionally known in which the press-bonding state is identified by detecting anything unusual during press-bonding operation, by means of a load sensor. Also proposed in Japanese Patent Disclosures Nos. 61-161,404, 61-165,645, etc. is a press-bonding defectiveness detecting method in which the press-bonding state is identified by visual recognition of processed images and the like.

In the former case, however, the unusual situation during the terminal press-bonding operation is discriminated by a load level at a certain sampling time detected by the load sensor, or the maximum load level detected. It is therefore difficult to determine the type of the abnormality, that is, whether the abnormal terminals are "split-cored" or "resin-engaged" or anything else. Practically, moreover, some abnormal terminals may be regarded as nondefective, depending on the degree of their abnormality. Thus, it is hard to accurately determine the abnormality of the products. In the latter case, on the other hand, "split-cored" terminals can be discriminated relatively easily, due to their singularity in shape. It is generally difficult, however, to identify "resin-engaged" or "sunk-cored" terminals, since they hardly manifest any differences in shape. In determining the defectiveness of terminals, moreover, it is advisable to remove defective ones after discriminating them during the press-bonding operation. Meanwhile, a press-bonding applicator and other devices are usually located above a terminal press-bonding table, so that there is no space through which the press-bonding spot can be surveyed by means of a visual recognition device, such as an ITV camera. Moreover, the press-bonding work is performed speedily and continuously. In consequence, it is difficult to obtain still images of good quality.

These circumstances are not limited to the terminal press-bonding operation for terminal-bonded electric wires, and also apply to the detection of the molding defectiveness of workpieces subjected to press-molding work, such as press-fit, press-grooving, press-stamping, deep press-drawing, etc.

OBJECTS AND SUMMARY OF THE INVENTION

The primary object of the present invention is to provide a method for reliably detecting the molding defectiveness of a press-molded workpiece with ease and in a short period of time.

Another object of the present invention is to provide a method for reliably detecting the press-bonding defectiveness of a terminal of a terminal-bonded wire with ease and in a short period of time, and a terminal press-bonding apparatus utilizing the method.

Still another object of the present invention is to provide a method capable of discriminating various press-bonding defectiveness patterns produced during press-bonding of a terminal of a terminal-bonded wire so that the press-bonding defectiveness of the terminal can be reliably detected, and a terminal press-bonding apparatus utilizing the method.

According to the present invention, there is provided a method for detecting the molding defectiveness of a press-molded workpiece, which comprises steps of detecting a time-based profile of a molding load acting on the workpiece during press-molding operation, comparing the detected molding load profile with a reference molding load profile, and determining the molding defectiveness of the workpiece in accordance with the result of the comparison.

According to an aspect of the present invention, there is provided a press-molding defectiveness detecting method adapted for the detection of the press-bonding defectiveness of a terminal which, including a wire barrel and an insulating barrel, is attached to the end of a covered wire so that the wire barrel and the insulation barrel are press-bonded to an exposed conductor portion at the end of the covered wire and a covered portion of the covered wire, respectively, by press-molding.

A time-based profile of a press-bonding load acting on the terminal during terminal press-bonding operation is detected, and the detected press-bonding load profile is compared with a reference press-bonding load profile, whereby the press-bonding defectiveness of the terminal is determined.

As required, the integral value of the press-bonding load acting on the terminal may be calculated on the basis of the detected press-bonding load profile so that the press-bonding defectiveness of the terminal can be determined by comparing the calculated integral value with a predetermined reference value. Alternatively, a plurality of press-bonding load values at predetermined points of time may be recorded on the basis of the detected press-bonding load profile so that the individual press-bonding load values are compared with predetermined reference values individually corresponding thereto, and that the press-bonding defectiveness of the terminal can be determined in accordance with the individual results of the comparison. Alternatively, moreover, a press-bonding load value at at least one predetermined point of time and the maximum press-bonding load value may be recorded on the basis of the detected press-bonding load profile so that the individual press-bonding load values are compared with predetermined reference values individually corresponding thereto, and that the press-bonding defectiveness of the terminal can be determined. Furthermore, profiles of press-bonding loads acting on the wire barrel and the insulation barrel during the press-molding may be detected separately so that the detected press-bonding load profiles are compared with reference press-bonding load profiles individually corresponding thereto, and that the press-bonding defectiveness of the terminal can be determined.

According to the present invention, moreover, there is provided a terminal press-bonding apparatus constructed so that a terminal is placed on a terminal press-bonding table, and is press-molded by means of an applicator, which is driven by means of a drive unit, whereby the terminal is attached to the end of a covered wire so that a wire barrel and an insulation barrel of the terminal are press-bonded to an exposed conductor portion at the end of the covered wire and a covered portion of the covered wire, respectively. A coupling member is disposed between the drive unit and the applicator and coupled directly to the applicator. Sensor means, which is attached to the coupling member, serves to detect a time-based profile of a press-bonding load acting on the terminal during the terminal press-bonding operation. Discrimination circuit means serves to compare the press-bonding load profile detected by the sensor means with a reference press-bonding load profile, thereby determining the press-bonding defectiveness of the terminal.

Preferably, the coupling means includes a neck portion narrower in cross-sectional area than any other portion thereof, the sensor means being attached to the neck portion.

Preferably, moreover, trigger means is used to detect the point of time for the start of the press-bonding operation by means of the applicator and deliver a trigger signal, and the discrimination circuit means starts reading the press-bonding load profile, detected by the sensor means, on termination of a predetermined period of time after the delivery of the trigger signal from the trigger means.

The above and other objects, features, and advantages of the invention will be more apparent from the ensuing detailed description taken in connection with the accompanying drawings.

BRIEF DESCRIPTION OF THE DRAWINGS

FIGS. 17A to 21A are graphs schematically showing the patterns of various press-bonding load signal waveforms detected when the wire barrel is press-bonded;

FIGS. 17B to 21B are graphs schematically showing the patterns of various press-bonding load signal waveforms detected when the insulation barrel is press-bonded;

DETAILED DESCRIPTION

Figure 1:
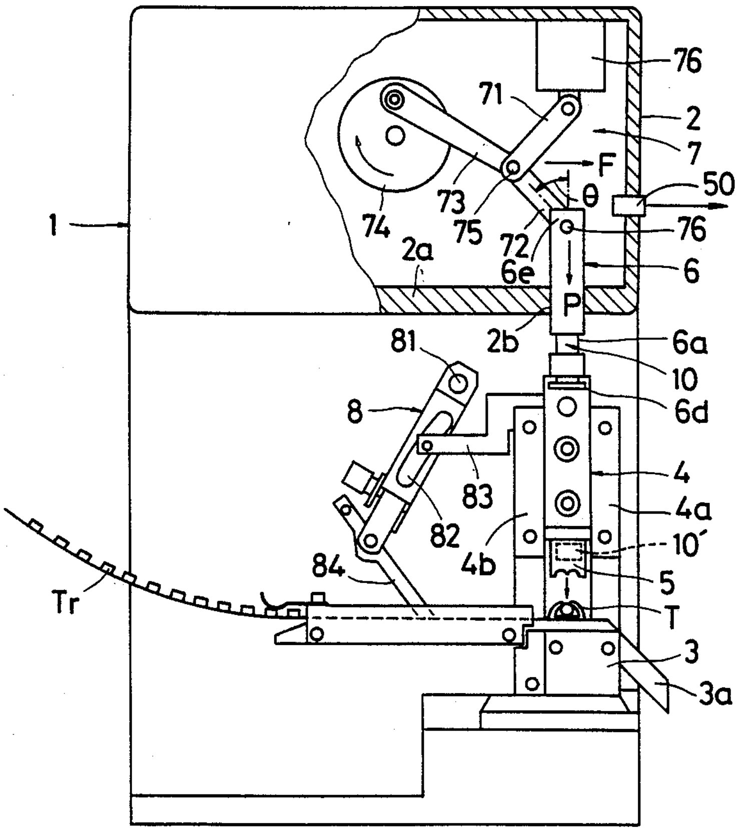
FIG. 1 is a cutaway front view showing an embodiment of a terminal press-bonding apparatus to which is applied a method for detecting the press-bonding defectiveness of a terminal-bonded wire according to the present invention.

FIG. 1 shows a terminal press-bonding apparatus 1 for effecting the method according to the present invention. The apparatus 1 comprises a press frame 2, a terminal press-bonding table 3 attached to the press frame 2, an applicator 4 disposed above the table 3 so as to be vertically movable along guide frames 4a and 4b, and a pressing portion 5 for terminal press-bonding attached to the lower end of the applicator 4. The press-bonding apparatus 1 further comprises a ram (coupling member) 6, which is slidably passed through a hole 2b in a center frame 2a of the press frame 2, a toggle unit 7 for vertically moving the ram 6, and a terminal feeding lever 8.

The toggle unit 7 includes an upper link 71, a lower link 72, a toggle 73, and a flywheel 74. One end of each of the links 71 and 72 and the toggle 73 is rockably mounted on a shaft 75. The other ends of the upper and lower links 71 and 72 are supported by a fixed portion 76 and the upper end of the ram 6, respectively, for rocking motion. The other end of the toggle 73 is rotatably supported by the peripheral portion of the flywheel 74. The flywheel 74 is rotated by means of a motor (not shown), and its rotation is transmitted to the ram 6 through the toggle 73 and the upper and lower links 71 and 72. Thus, the ram 6 is reciprocated vertically.

The upper end of the terminal feeding lever 8 is rockably mounted on a shaft 81. One end of an arm 83 is fixed to the upper end of the applicator 4. The other end of the arm 83 is fitted in a drive groove 82 which is formed in the central portion of the lever 8. A rod 84 is attached to the lower end of the lever 8. The terminal feeding lever 8 is swung from side to side by the vertical motion of the applicator 4, thereby driving the rod 84 horizontally. As a result, a number of terminals T, arranged in the form of a continuous terminal train Tr, are fed one by one onto the terminal table 3. Electric wire end portions are discharged through a tray 3a after they are fitted individually with the terminals T.

Figure 2:
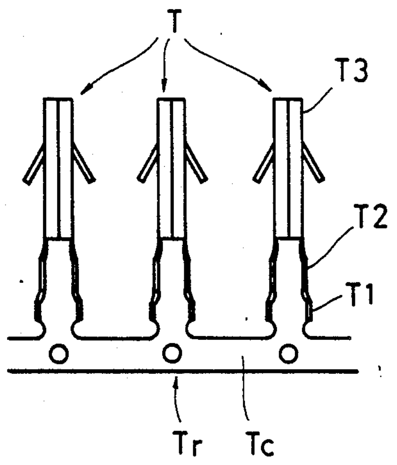
FIG. 2 is a partial plan view of a terminal train Tr fed to the terminal press-bonding apparatus shown in FIG. 1.
Figure 3:
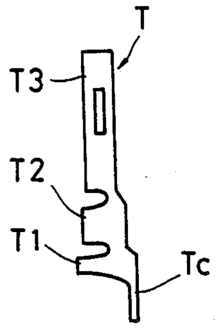
FIG. 3 is a side view of the terminal train Tr shown in FIG. 2.
Figures 4A, 4B, 4C, 4D:
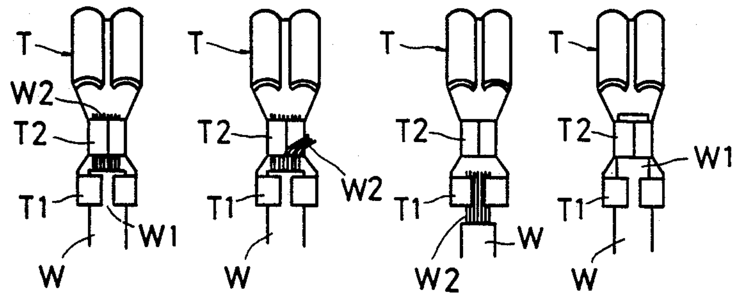
FIG. 4A is a plan view showing a state such that a press-bonded terminal is normally attached to the end of a covered wire.
FIGS. 4B, 4C and 4D are plan views showing various states such that press-bonded terminals are attached defectively.

FIGS. 2 and 3 show the terminal train Tr in which a number of terminals T, each formed of a conductive metal plate, are coupled by means of a carrier Tc. Each terminal T is comprised of a wire barrel T2, an insulation barrel T1, a contact terminal portion T3, etc. The terminal train Tr is fed to the terminal press-bonding apparatus 1, and the individual terminals T are cut off from the carrier Tc. Then, the wire barrel T2 is press-bonded to cores W2 at the end of its corresponding electric wire W, while the insulation barrel T1 is press-bonded to an insulating-resin-coated portion W1, as shown in FIG. 4A mentioned later.

When the pivotal point (corresponding to the shaft 75) of the upper and lower links 71 and 72 is pressed by the toggle 73, in the toggle unit 7, the links 71 and 72 are urged to be aligned. The more closely the alignment line resembles a straight line, the greater a vertical force P acting in the longitudinal direction of the links 71 and 72 will be. If the links 71 and 72 are equal in length, the force P of the link 72 to depress the ram 6 is given by $$P=F/(2\tan\theta),$$

where $\theta$ is the angle formed between a vertical line and the link 72, and F is the urging force of the toggle 75.

The force P is a force (hereinafter referred to as press-bonding load) with which the pressing portion 5 for terminal press-bonding presses the terminals T on the terminal table 3. Thus, the ram 6 is subjected to a reaction force P' (=P) against the press-bonding load P when the terminals are press-bonded. Thereupon, the reaction force P' acting on the ram 6 is detected.

Figure 5:
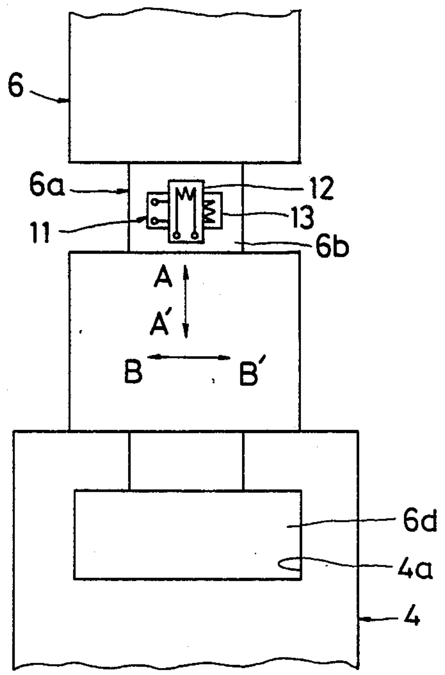
FIG. 5 is an enlarged view of the principal part of a ram 6 of the terminal press-bonding apparatus shown in FIG. 1, illustrating in detail the way a load sensor is mounted.

The ram 6 has a slender neck portion 6a which is formed by rectangularly cutting a predetermined portion, e.g., the lower portion, of the ram body over the whole circumference thereof, as shown in FIGS. 1 and 5. The ram 6 is coupled to the applicator 4 in a manner such that its lower end 6d is removably fitted in an engaging groove 4a formed at the upper end portion of the applicator 4. An upper end 6e of the ram 6 is rockably coupled to the other end of the lower link 72 by means of a coupling pin 76. Thus, the ram 6 serves to connect the applicator 4 and the link mechanism of the toggle unit 7. A load sensor 10 is attached to the neck portion 6a of the ram 6.

The load sensor 10 is composed of a pair of sensor elements 11 and 11', which are provided on a front surface 6b and a reverse surface, respectively, of the neck portion 6a. The sensor element 11 is formed, for example, of two strain gages (strain resistance elements) or load cells 12 and 13. The load cells 12 and 13 are arranged at right angles to each other. The load cell 12 is pasted on the neck portion 6a along the axial direction (longitudinal direction) thereof, and the other load cell 13 is pasted at right angles (transverse) to the axial direction. The resistance value of the load cell 12 varies depending on the longitudinal contraction (or strain) of the neck portion 6a, as indicated by arrow AA'. The resistance value of the load cell 13, on the other hand, varies depending on the transverse extension (or strain) of the neck portion 6a, as indicated by arrow BB'.

Like the sensor element 11 on the front surface 6b of the neck portion 6a of the ram 6, the sensor element 11' on the reverse side of the neck portion 6a comprises two strain gages or load cells 12' and 13', and is pasted substantially corresponding in position to the sensor element 11.

The load sensor 10 detects the reaction force against the press-bonding load on the ram 6 by detecting the strain produced in the neck portion 6a of the ram 6 during terminal press-bonding operation by means of the ram 6. Since the neck portion 6a is narrower than any other portion of the ram 6, the reaction force produced in the ram 6 during the press-bonding operation can be detected very accurately and with high sensitivity by detecting the strain of the neck portion 6a. The ram 6, which is a coupling member removably coupled to the applicator 4, need not be replaced, although the applicator is replaced depending on the types of the terminals and the electric wires. Accordingly, the load sensor 10 can be left unremoved on the ram 6, thus ensuring improved operating efficiency.

Figure 6:
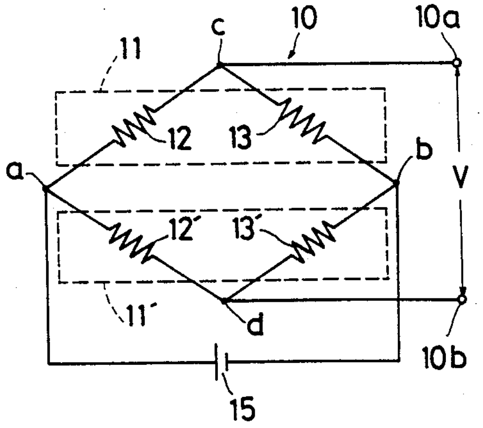
FIG. 6 is a circuit diagram illustrating the connection of the load sensor shown in FIG. 5.

As shown in FIG. 6, the load cells 12, 13, 12' and 13' of the sensor elements 11 and 11' of the load sensor 10 are connected to a bridge circuit. Junctions a and b between the load cells 12 and 12' and between the cells 13 and 13' are connected to a power source 15, while junctions c and d between load cells 12 and 13 and between cells 12' and 13' are connected to terminals 10a and 10b, respectively.

The terminals 10a and 10b of the load sensor 10 are connected to the input terminal of a strain amplifier 21 of a pattern discrimination circuit 20. The output terminal of the strain amplifier 21 is connected to the respective input terminals of an analog-to-digital converter (hereinafter referred to as A/D converter) 22 and a comparator 23. The output terminal of the comparator 23 is connected to the trigger input terminal of the A/D converter 22. The output terminal of the converter 22 is connected to a microcomputer (hereinafter referred to as MCU) 26 which comprises a memory 24, a central processing unit (hereinafter referred to as CPU) 25, etc.

The operation of the terminal press-bonding apparatus will now be described.

The toggle 73 and the upper and lower links 71 and 72 of the toggle unit 7 convert the rotation of the flywheel 74 into reciprocation of the ram 6, thereby causing the applicator 4 to reciprocate. As the applicator 4 reciprocates in this manner, the terminal feeding lever 8 swings from side to side, thereby feeding the terminals T from the terminal train Tr one by one onto the terminal press-bonding table 3 with the aid of the rod 84. At the same time, the electric wire W is fed to the table 3 so that the coated end portion W1 and the cores W2 are put on the insulation barrel T1 and the wire barrel T2, respectively, of each corresponding terminal T.

After the electric wire W is put on the terminal T, the pressing portion 5 attached to the lower end of the descending applicator 4 presses the terminal T which, along with the end of the wire, is placed on the terminal press-bonding table 3. When the terminal T is pressed in this manner, the ram 6 is subjected to a reaction force, so that a strain is produced in the neck portion 6a. The load sensor 10 detects the strain in the neck portion 6a, and delivers an electrical signal (strain signal) V indicative of the detected strain.

The signal V delivered from the load sensor 10 is amplified by the strain amplifier 21, and then applied to the A/D converter 22 and the comparator 23. The comparator 23 compares the input signal V and a reference signal $V_S$. If $V > V_S$ is detected, the comparator 23 delivers a trigger signal Pt, thereby subjecting the A/D converter 22 to a level trigger. On receiving the trigger signal Pt, the A/D converter 22 starts sampling, and performs A/D conversion of the input signal V. Then, the waveform of the input signal V is stored successively in the memory 24 of the MCU 26. The reference signal $V_S$ of the comparator 23 is adjusted to a predetermined voltage level such that the leading edge of a common waveform (mentioned later), produced at the time of terminal press-bonding, can be seized. Those signals whose level is higher than the predetermined level are all sampled.

The sampling period of the waveform of the signal V varies depending on the operating time of the press used. In this embodiment, the press-bonding period is about 0.8 sec, and the press-bonding time is about 80 msec. If the waveform of the signal V is divided into about 400 equal parts, therefore, it can enjoy a satisfactory reproducibility. Thus, the sampling period used is about 200 μsec.

The CPU 25 previously stores therein the signal waveform (hereinafter referred to as normal waveform) in a normal press-bonding state, which is stored in the memory 24. The CPU 25 compares the stored normal waveform with each waveform obtained at the time of each terminal press-bonding cycle, thereby determining whether the obtained waveform is normal or not. If the CPU 25 judges the waveform to be abnormal, it delivers an abnormality discrimination signal $V_O$.

FIGS. 4A to 4D show various states of press-bonding in which the terminal T is press-bonded to the electric wire W by means of the terminal press-bonding apparatus 1. FIG. 4A shows a state such that the terminal T is normally press-bonded by the apparatus 1. When the terminal T is normally bonded to the end of the wire W, the insulation barrel T1 of the terminal T securely holds the insulated portion W1 of the wire W so as to cover the whole periphery thereof and be situated at a narrow distance from the end edge of the insulated portion W1. The wire barrel T2 securely holds the cores W2 so as to cover the whole periphery thereof.

The terminal T cannot be normally press-bonded to the electric wire W in various cases. FIGS. 4B, 4C and 4D show typical examples of such cases. In FIG. 4B, some of the cores W2 are wrongly situated outside the wire barrel T2 ("split-cored"). In FIG. 4C, the cores W2 are held by the insulation barrel T1 of the terminal T ("sunk-cored"). In FIG. 4D, the insulated portion W1 is held by the wire barrel T2 ("resin-engaged"). According to the present invention, these defective states of press-bonding, which are to be eliminated, are detected as follows.

FIGS. 8A to 8F and 9A to 9F show examples of signal waveform patterns obtained at the time of terminal press-bonding. In the cases shown in FIGS. 8A to 8F, a vinyl-coated wire (AVS 0.5 SQ; 7 cores) is used as the electric wire to be press-bonded to the terminal. In the cases shown in FIGS. 9A to 9F, a vinyl-coated wire (AVS 1.25 SQ; 16 cores) is used for the purpose. In these drawings, which illustrate time-based transitions of the press-bonding load, full lines represent normal waveforms, while dashed lines represent defective waveforms.

Figure 8A:
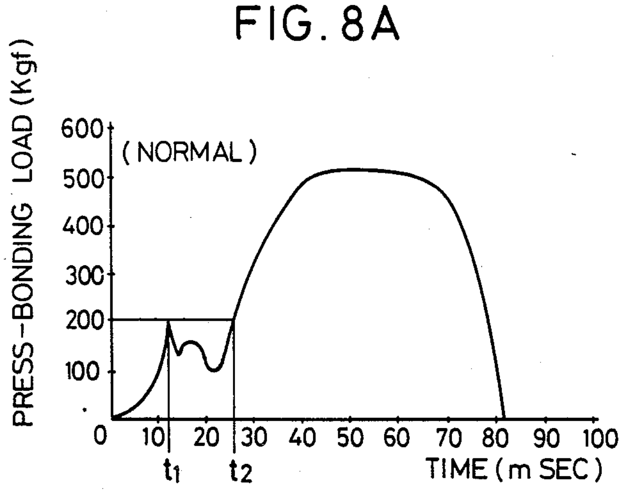
FIGS. 8A to 8F are graphs schematically showing the patterns of various press-bonding load signal waveforms detected when a terminal is press-bonded to an electric wire having seven cores.
Figure 8B:
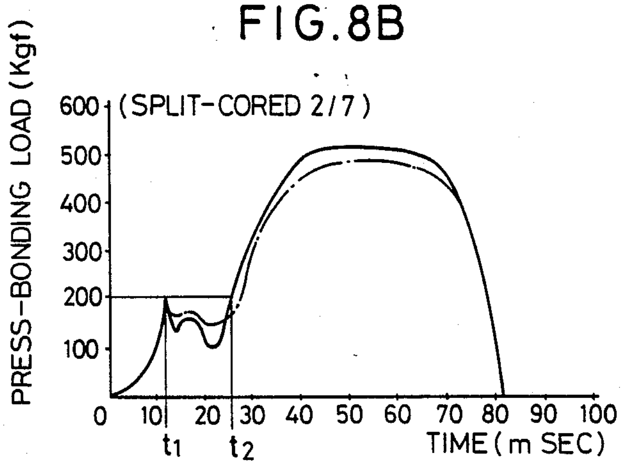
Figure 8C:
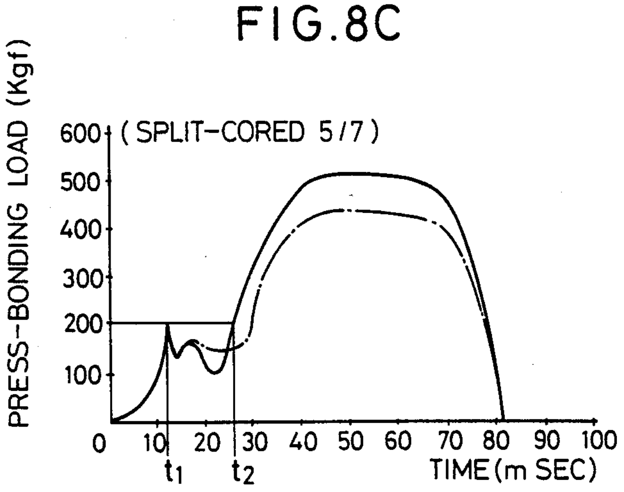
Figure 8D:
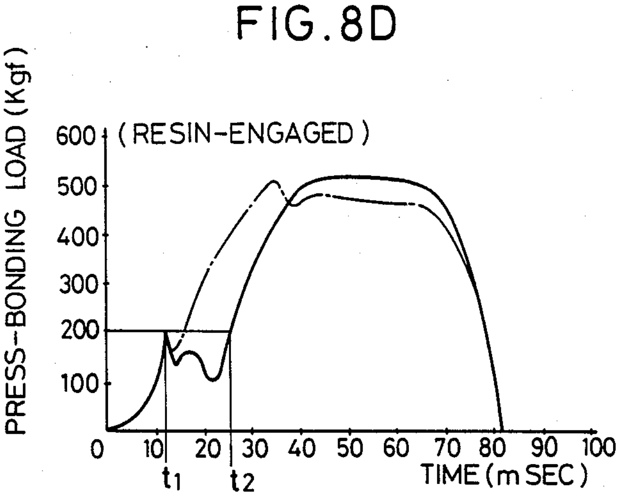
Figure 8E:
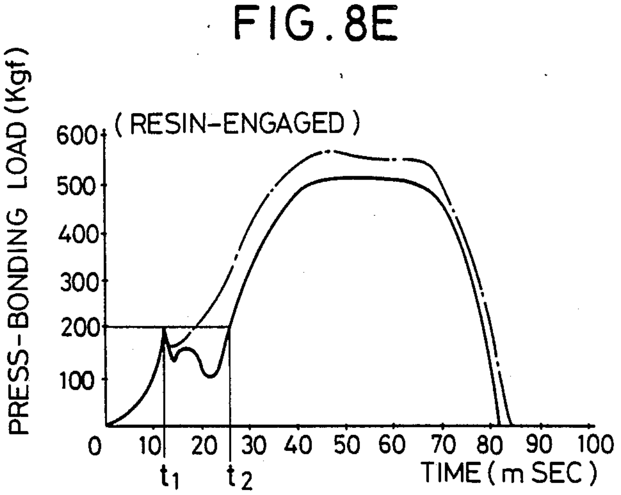
Figure 9A:
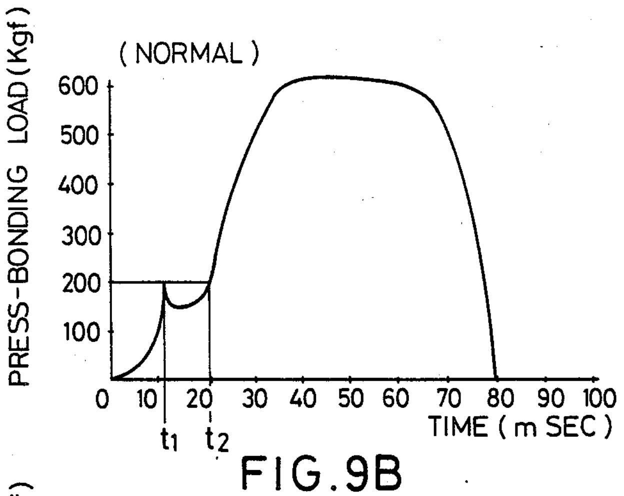
FIGS. 9A to 9F are graphs schematically showing the patterns of various press-bonding load signal waveforms detected when a terminal is press-bonded to an electric wire having sixteen cores.
Figure 9B:
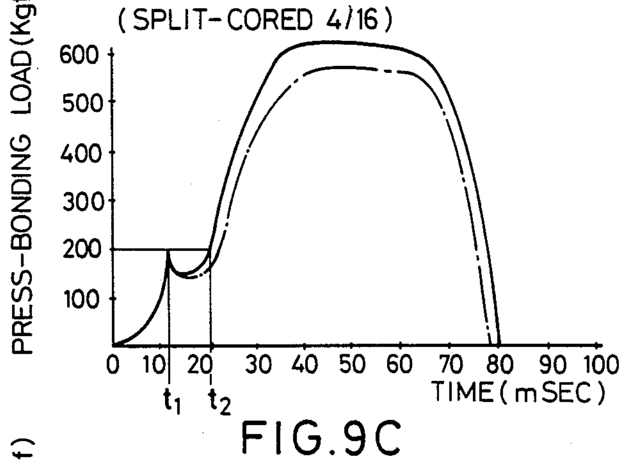
Figure 9C:
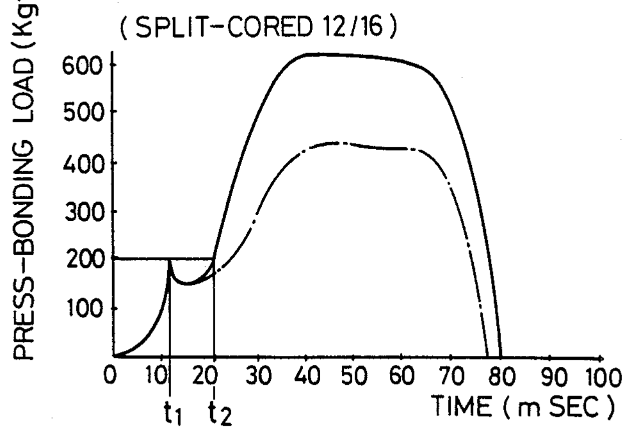
Figure 9D:
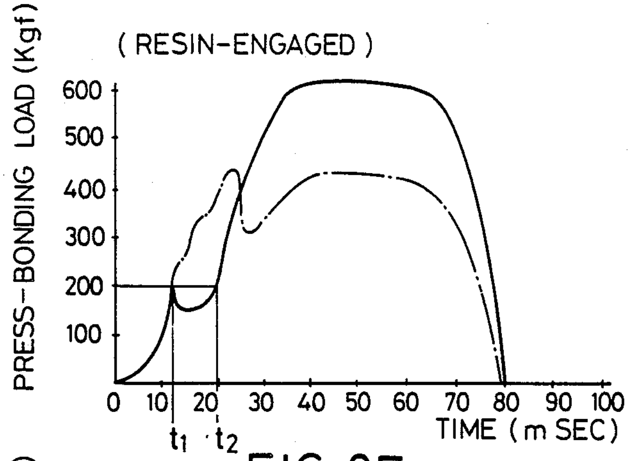
Figure 9E:
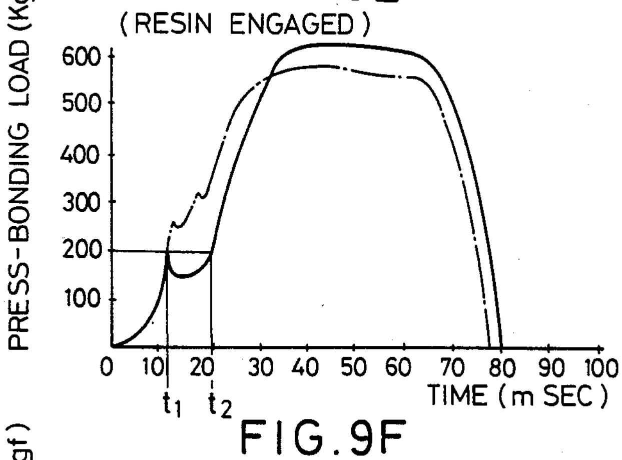

FIGS. 8A and 9A show the normal signal waveforms obtained in the normal press-bonding state. The waveforms indicated by the dashed lines in FIGS. 8B, 8C, 9B and 9C are typical examples of waveforms peculiar to "split-cored" press-bonded terminals. FIG. 8B is indicative of a case such that two out of seven cores are disengaged from the wire barrel T2 (this state is indicated by "2/7" in FIG. 8B, and the same applies hereinafter), while FIG. 8C is indicative of a case such that five out of the seven cores are disengaged from the barrel T2 ("5/7"). FIG. 9B is indicative of a case such that four out of sixteen cores are disengaged from the wire barrel T2 ("4/16"), while FIG. 9C is indicative of a case such that twelve out of the sixteen cores are disengaged from the barrel T2 ("12/16"). As seen from these waveforms, the peak level of the press-bonding load depends on the number of disengaged cores. Thus, the acceptability of each terminal can be determined by obtaining the level difference between its waveform and the waveform (FIG. 8A or 9A) of the normal terminal (FIG. 4A).

For the "resin-engaged" terminals, the patterns of the press-bonding load have distinctive features. There are substantial differences between these load patterns and those of the normal waveforms indicated by the full lines, during the period between the points of time of 15 msec and 30 msec after the start of the press-bonding operation, as indicated by the dashed lines in FIGS. 8D, 8E, 9D and 9E. More specifically, the press-bonding load of the "resin-engaged" terminals, during this period, is much greater than that of the normal terminals. Thus, the "resin-engaged" terminals can be discriminated by detecting the press-bonding load during the period between the time points of 15 msec and 30 msec after the start of the press-bonding operation, and comparing the detected load with the press-bonding load of the normal terminals. If the defective terminals are fully "resin-engaged", the increased press-bonding load tends to drop sharply in the middle of the press-bonding operation, as indicated by the dashed lines in FIGS. 8D and 9D.

Figure 8F:
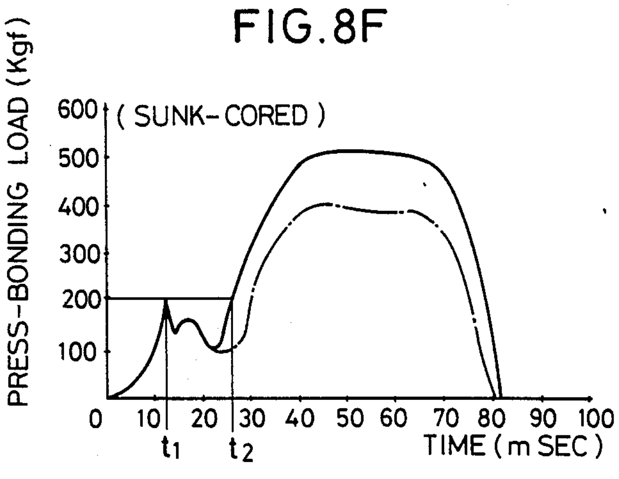
Figure 9F:
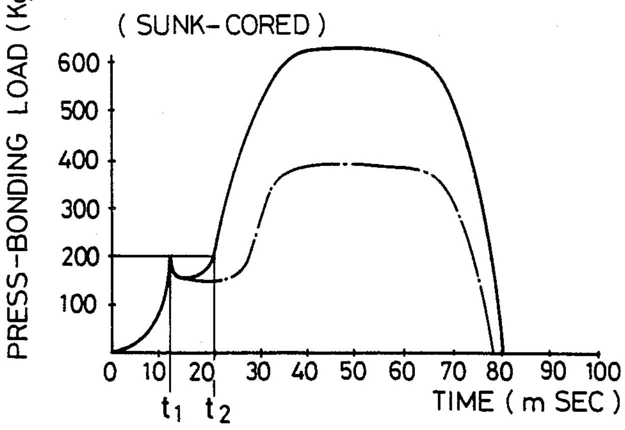

For the "sunk-cored" terminals, the peak levels of the press-bonding load waveforms and the load levels near the time point of 25 msec are considerably different from those of the normal terminals, as indicated by the dashed lines in FIGS. 8F and 9F. Thus, the defectiveness of each terminal can be determined by detecting the differences in these levels.

In the press-bonding patterns of the defective terminals (indicated by the dashed lines in FIGS. 8B to 8F and 9B to 9F), the difference (t2−t1) between time t1 for the peak of the waveform obtained when the terminal is cut off and time t2, at which the same load level as the peak level is attained next with the terminal press-bonded, is smaller or greater than that for the waveform patterns of the normal terminals indicated by the full lines. The former is smaller than the latter for the "resin-engaged" terminals, while the former is greater than the latter for the "split-cored" or "sunk-cored" terminals. Thus, the defectiveness of each terminal can be also determined by storing time t1, as a reference point for the comparison, and then detecting time t2.

As described above, the defectiveness of those "split-cored" terminals which include many dislocated cores and "sunk-cored" terminals can be determined by the level of the press-bonding load, while that of the "resin-engaged" terminals can be determined by the change of the pattern in the middle of the press-bonding operation. Also, the degree of the defectiveness can be identified by examining the peak level during the press-bonding operation.

Figure 10:
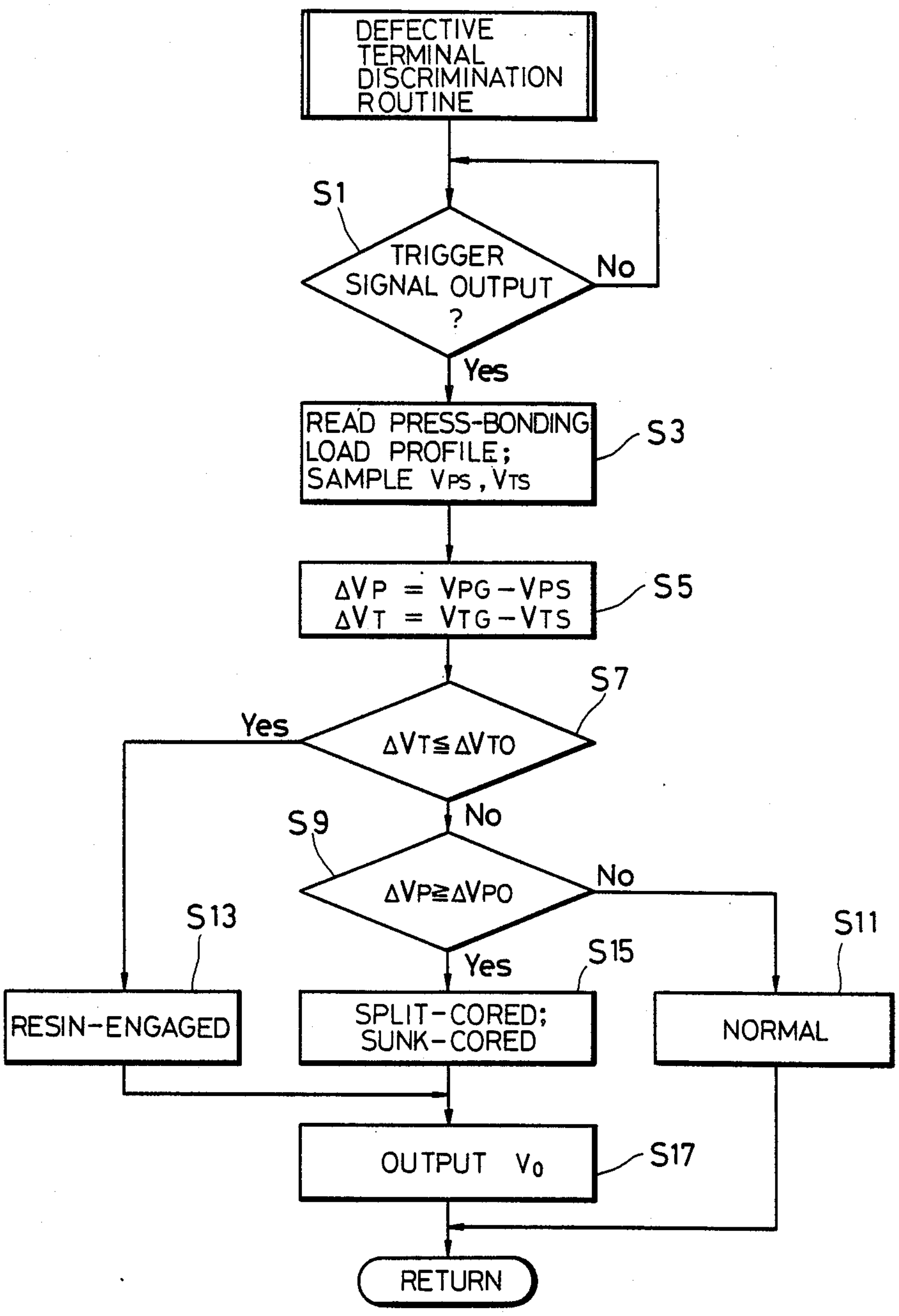
FIG. 10 is a program flow chart of a defective terminal discrimination routine executed by means of a microcomputer (MCU) 26 shown in FIG. 7.

FIG. 10 shows an example of the defective terminal discrimination program which is executed by the pattern discrimination circuit 20. First, the MCU 26 of the circuit 20 waits until the trigger signal Pt is delivered from the comparator 23 (step S1). In the comparator 23, the press-bonding load signal V inputted through the strain amplifier 21 and the reference signal $V_S$ is compared. If the load signal V is higher in level than the reference signal $V_S$, the trigger signal Pt is outputted. The MUC 26 waits repeating step S1 until the trigger signal Pt is outputted. When the trigger signal Pt is delivered from the comparator 23, a pressure-bonding load profile is read. The timing for the reading of the press-bonding load profile is kept constant by means of the trigger signal Pt.

The press-bonding load signal V is sampled from the read profile, a press-bonding load $V_{TS}$ at time t2 is stored, and a maximum level $V_{PS}$ of the press-bonding load signal V is detected and stored (step S3). As shown in FIG. 8A or 9A, time t2, which is set in accordance with a number of empirical data, is the point of time when the press-bonding load of the same level as the load obtained at time t1 when the terminal T is cut off from the terminal train Tr, during the normal terminal press-bonding operation, is obtained.

Then, differences $\Delta V_T$ ($=V_{TG}-V_{TS}$) and $\Delta V_P$ ($=V_{PG}-V_{PS}$) between the values $V_{TS}$ and $V_{PS}$ sampled in step S3 and their corresponding reference values $V_{TG}$ and $V_{PG}$ are calculated (step S5). The reference values $V_{TG}$ and $V_{PG}$ are the press-bonding load obtained at time t2 and the maximum level, respectively, of the normal press-bonded terminal. These values are previously stored in the memory 24. The MCU 26 determines the defectiveness of the terminal by the calculated differences $\Delta V_T$ and $\Delta V_P$. Thus, wheter the difference $\Delta V_T$ is smaller than a predetermined negative discrimination value $\Delta V_{TO}$ is determined in step S7, and whether the difference $\Delta V_T$ is greater than a predetermined positive discrimination value $\Delta V_{PO}$ is determined in step S9. If the respective conclusions of these steps of discrimination are both NO, it is concluded that the terminal has been press-bonded normally (step S11). If the conclusion of step S7 is Yes, the terminal is judged to be "resin-engaged" (step S13). If the conclusions of steps S7 and S9 are NO and YES, respectively, the terminal is judged to be "split-cored" or "sunk-cored" (step S13). If a defective terminal is detected, the MCU 26 proceeds to step S17, and delivers the abnormality discrimination signal $V_O$. Thus, the defective terminal discrimination is finished, and the program returns to step S1, whereupon the same discriminating operation is repeated for the individual terminals.

The abnormality discrimination signal $V_O$ delivered from the MCU 26 of the pattern discrimination circuit 20 is supplied to an alarm device, such as an alarm lamp, which informs an operator of abnormal terminal press-bonding. Usually, the automatic terminal press-bonding apparatus is constructed so that terminal-connected electric wires are automatically tied up in bundles of regular quantities (e.g., 100 and 200), and are delivered from the apparatus by means of a conveyor mechanism. Therefore, those bundled wires which are judged to be abnormal by the abnormality discrimination signal $V_0$, at the time of the delivery, may be discharged separately. In this manner, wires with defective terminals can be prevented from being fed to the next step of operation.

The abnormality discrimination signal is delivered for each type of abnormality, and a counter is used to count abnormal wires or defective terminals for each type and display the count value. By doing this, the troubles or defective spots of the terminal press-bonding apparatus can be detected. If the count number of "resin-engaged" terminals is extremely large, then a wire stripper for stripping the wires is in trouble. If the count number of "split-cored" terminals is large, then it may be concluded that the press-bonding positions of the terminals are wrong.

If the dislocation of only one or two cores of each "split-cored" terminal, as shown in FIGS. 8B or 9B, is put in question, the maximum permissible limit of the variation of the press-bonding load profile of a normal terminal ought to be narrowed considerably, since the profile of the press-bonding load of the defective terminal differs only slightly from that of the normal terminal. It is therefore difficult to discriminate the abnormality.

Figure 12A:
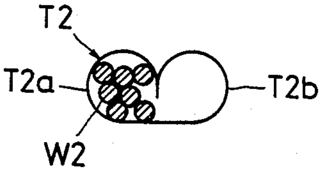
FIGS. 12A to 12D are sectional views schematically showing terminal press-bonding states corresponding to the press-bonding load signal waveform patterns shown in FIGS. 11A to 11D, respectively.
Figure 12B:
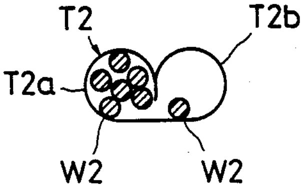
Figure 12C:
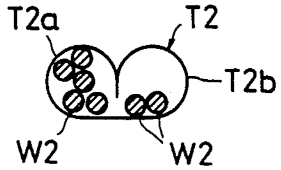
Figure 12D:
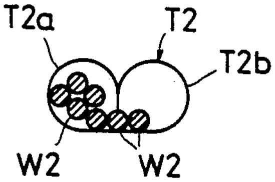

Let it be supposed, for example, that a wire including seven cores and having a cross-sectional area of 0.5 $mm^2$ is press-bonded to a terminal. If all the cores W2 are press-bonded to a left-hand half T2*a* of the wire barrel T2 of the terminal T, as shown in FIG. 12A, the resulting product is regarded as normal. In FIG. 12B, one of the cores W2 is bonded to a right-hand half T2*b* of the wire barrel T2. In FIG. 12C, two of the cores W2 are bonded to the right-half T2*b*. In FIG. 12D, moreover, one of the cores W2 is attached to the right-hand half T2*b*, while another is in the center of the wire barrel T2, that is, on the boundary between the left- and righ-hand halves T2*a* and T2*b*. The situations shown in FIGS. 12B, 12C and 12D entail various abnormal press-bonding conditions.

Those cores inside the right-hand half T2*b* of the wire barrel T2, as shown in FIGS. 12B to 12D, cannot be press-bonded to the wire barrel T2. In these cases, therefore, the terminal can practically be regarded as "split-cored." Having the cross-sectional area of 0.5 $mm^2$ or thereabout, these cores for each terminal cannot be large in number. Accordingly, the capacity for current flowing through the press-bonded portion can be greatly influenced by the dislocation of only one or two cores. In the case of a wire which includes a relatively large number of cores and has a cross-sectional area of 1.25 $mm^2$ or more, the current capacity cannot be influenced by the dislocation of one or two cores, and cannot therefore entail any defectiveness in press-bonding.

The press-bonding defectiveness of those wires with a relatively small number of cores, among which one or two cores are dislocated, and whose press-bonding load profile differs only slightly from that of normal products, can be detected in the following manner.

A reaction force acting on the press, during the terminal press-bonding operation, is detected, and the sum total of the press-bonding loads is obtained. More specifically, the time-based transition of the reaction force is obtained, and the integral value of the reaction force is calculated. The press-bonding defectiveness and its type can be discriminated by the calculated integral value of the reaction force. Thus, the press-bonding defectiveness of the terminal can be detected and classified accurately and speedily.

More specifically, the microcomputer 26 adds voltage values corresponding to waveforms inputted from the A/D converter 22, in accordance with a time series, for the individual sampling cycles, thereby obtaining the sum total. The resulting sum total is compared with that for the normal product. If the former is smaller than the latter, the terminal concerned is regarded as defective. Thus, the discrimination circuit 20 prepares patterns of the time-based transitions of the press-bonding loads detected by the load sensor 10, as shown in FIGS. 11A to 11D. The press-bonding defectiveness and its type are discriminated by the integral values of the patterns, that is, the sum total of the press-bonding loads. In this case, a principle is used such that the sum total of the reaction forces acting on the press during the terminal press-bonding operation, that is, work load, is constant if terminals and wires of the same type are used for the purpose.

Figure 11A:
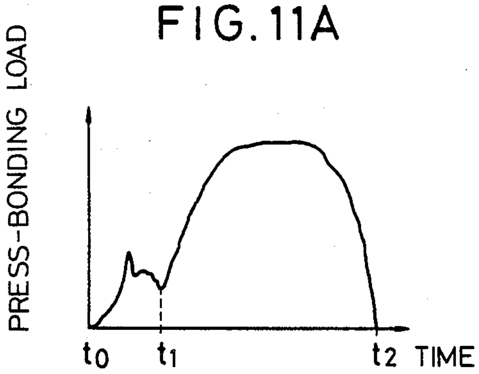
FIGS. 11A to 11D are graphs schematically showing the patterns of various press-bonding load signal waveforms detected when the cores of a 7-core electric wire are press-bonded to a half of a wire barrel of a terminal.

The timing for press-bonding the cores on the terminal is determined physically, depending on the type of the terminal, the cross-sectional area of the wire, the tooth form of the press, etc. In the case of the normal product whose cores are normally press-bonded to the barrel T2, as shown in FIG. 12A, the pattern of the press-bonding load has such a form as is shown in FIG. 11A, for example. In FIG. 11A, that portion of the curve corresponding to the period between press-bonding start time t0 to time t1 represents the press load used when the terminal is cut off. During the period between times t1 and t2, the terminal is press-bonded. The sum total of the press-bonding loads can be obtained by integrating the pattern waveform corresponding to the period between times t1 and t2. In the case of a "split-cored" or "sunk-cored" terminal, the sum total of the press-bonding loads is smaller than in the normal case.

Figure 11B:
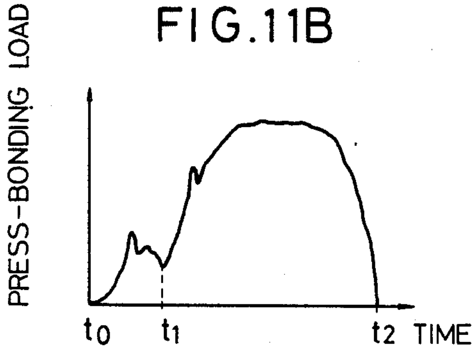
Figure 11C:
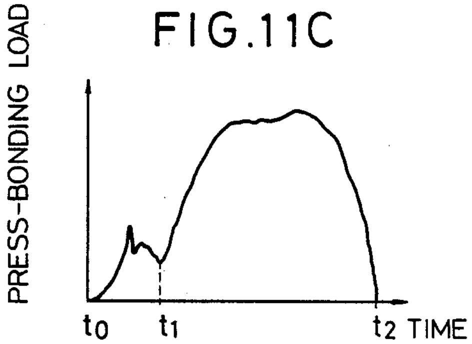
Figure 11D:
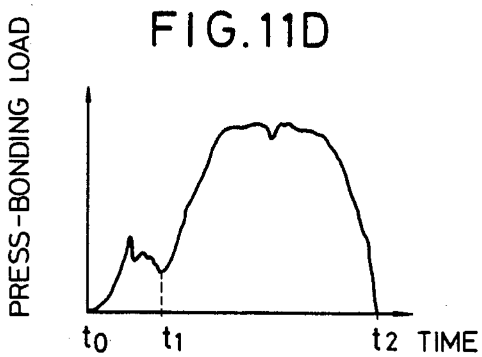

Since all the cores are not inserted parallel to the terminal T, some of them may possibly be situated across the center of the barrel T2, as shown in FIG. 12D. In such a case, the load pattern may be diverse, as shown in FIG. 11D, for example.

If one or two cores are situated inside the left-or right-hand half T2*a* or T2*b* of the wire barrel T2, as shown in FIG. 12B or 12C, the cores may possibly fail to be press-bonded to the wire barrel. In such a case, the pattern of the press-bonding load may be shaped as shown in FIG. 11B or 11C, for example. If the cores are not press-bonded, the sum total of the press-bonding loads is naturally smaller than in the normal case shown in FIG. 12A. In the cases of FIGS. 11B and 11C, the terminal concerned can be regarded as "split-cored," since the cores W2 practically are not press-bonded to the wire barrel T2.

Such press-bonding defectiveness as the dislocation of one or two cores may be accurately detected by an alternative method as follows. The press-bonding loads of the wire barrel and the insulation barrel are detected independently, and their respective press-bonding load detection signals are compared with the normal press-bonding load profiles. The defectiveness of the terminal is determined by the result of such comparison.

Figure 13:
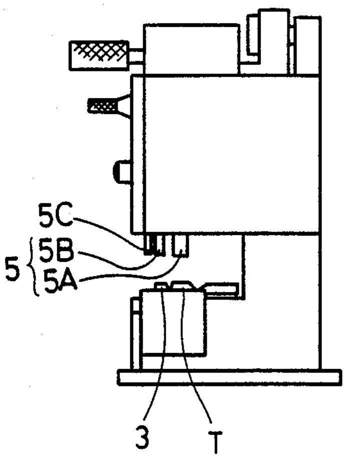
FIG. 13 is a side view of a terminal press-bonding apparatus in which an insulation barrel and a wire barrel of a terminal is press-bonded by means of separate pressing knife edges.

More specifically, in order to separately detect the press-bonding loads of the wire barrel and the insulation barrel, the pressing portion 5 for terminal press-bonding of the terminal press-bonding apparatus 1 shown in FIG. 1 is composed a knife edge 5A used to press the wire barrel T2 of the press-bonded terminal T and a knife edge 5B used to press the insulation barrel T1, as shown in FIG. 13. These knife edges are arranged in front and in rear on the lower end of the applicator 4, and are each formed of a substantially planar member. A punch 5C for cutting the carrier Tc of the terminal train Tr is located in front (on the left in FIG. 13) of the knife edge 5B of the pressing portion 5.

When the applicator 4 lowers so that the knife edge 5A presses the wire barrel T2 against the cores W2 at the end of the wire a press-bonding load Pa, a reaction force Pa' equivalent to the load Pa is produced in the edge 5A. As result, the knife edge 5A is strained corresponding to the reaction force Pa'. When the knife edge 5B for the insulation barrel T1 is used to press the the barrel T1 against the resin-coated portion W1 with a press-bonding load Pb, a reaction force Pb' equivalent to the load Pb is produced in the edge 5B. As a result, the knife edge 5B is strained corresponding to the reaction force Pb'. Also, a reaction force is produced in the punch 5C when the punch is used to cut the carrier Tc of the terminal train Tr.

Figures 14, 15:
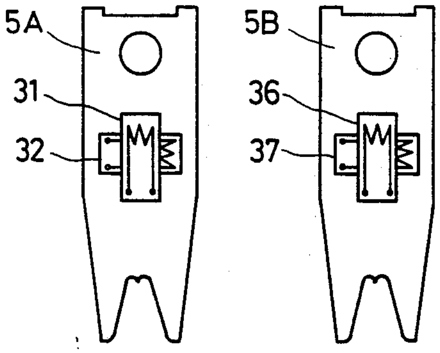
FIG. 14 is a partial enlarged view showing the way a load sensor is mounted on a knife edge 5A for the wire barrel shown in FIG. 13.
FIG. 15 is a partial enlarged view showing the way a load sensor is mounted on a knife edge 5B for the insulation barrel shown in FIG. 13.

Thereupon, the knife edges 5A and 5B are fitted, respectively, with load sensors 30 and 35 for press-bonding load detection which are each formed of a strain resistance element or load cell, as shown in FIGS. 14 and 15. The load sensors 30 and 35 serves to detect the strains produced in the knife edges 5A and 5B at the time of the terminal press-bonding.

The load sensor 30 for detecting the press-bonding load of the wire barrel comprises sensor elements 31 and 32 (see FIG. 14), mounted on the front side of the knife edge 5A, and sensor elements 33 and 34 on the rear side of the edge 5A. The load sensor 35 for detecting the press-bonding load of the insulation barrel comprises sensor elements 36 and 37 (see FIG. 15), mounted on the front side of the knife edge 5B, and sensor elements 38 and 39 on the rear side of the edge 5B.

Figure 16:
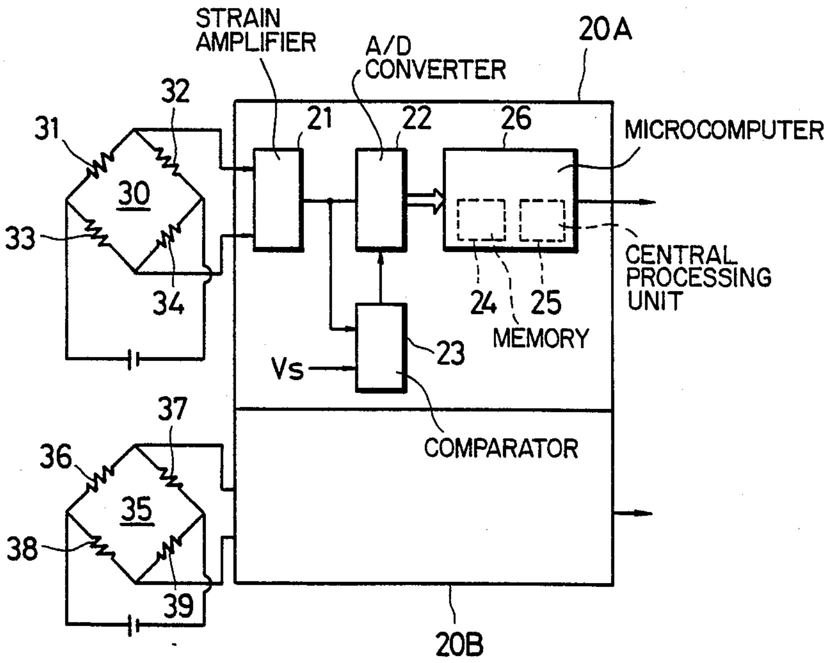
FIG. 16 is a block diagram showing the internal configuration of a pattern discrimination circuit for determining the press-bonding defectiveness of the insulation barrel and the wire barrel when the barrels are press-bonded independently.

As shown in FIG. 16, the sensor elements 31, 32, 33 and 34, which constitute the load sensor 30, are connected in the form of a bridge circuit, and the sensor elements 36, 37, 38 and 39, which constitute the load sensor 35, are connected in the form of another bridge circuit. These bridge circuits are connected individually to a waveform pattern discrimination circuit 20A for the press-bonding load detection signal for the wire barrel and a waveform pattern discrimination circuit 20B for the press-bonding load detection signal for the insulation barrel.

Figure 7:
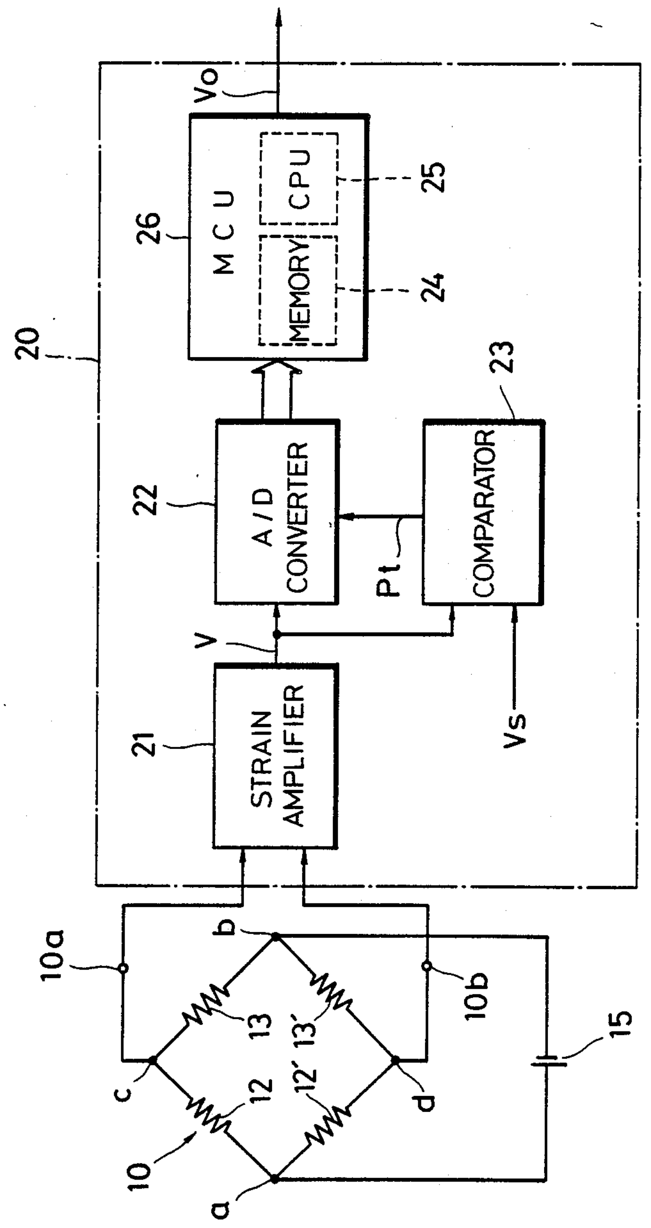
FIG. 7 is a block diagram showing the internal configuration of a pattern discrimination circuit for determining the mounting defectiveness of press-bonded terminals.

The waveform pattern discrimination circuits 20A and 20B have substantially the same configuration as the pattern discrimination circuit 20 shown in FIG. 7. Therefore, like reference numerals are used to designate the corresponding components of the circuits 20A and 20B, and a description of these components is omitted herein.

In the apparatus constructed in this manner, when the applicator 4 moves vertically so that the knife edges 5A and 5B press the wire barrel T2 and the insulation barrel T1 of the terminal T on the terminal press-bonding table 3 against the cores W2 at the end of the wire and the resin-coated portion W1, respectively, the load sensors 30 and 35 detect the respective press-bonding loads of the wire barrel T2 and the insulation barrel T1, and their bridge circuits deliver their respective detection signals. These detection signals are applied to the waveform pattern discrimination circuits 20A and 20B, whereupon whether the detection signal waveform patterns are normal is determined in the same manner as aforesaid. If the pattern or patterns are judged as abnormal, an abnormality discrimination signal or signals are delivered from the discrimination circuit(s) 20A and/or 20B.

Figure 17A:
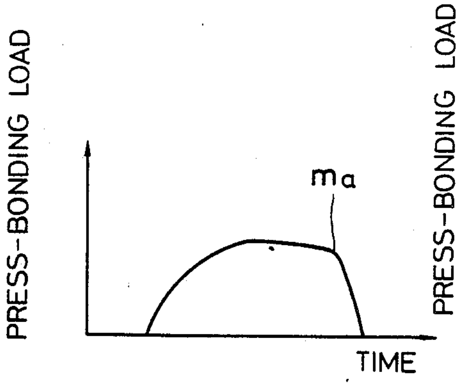
Figure 17B:
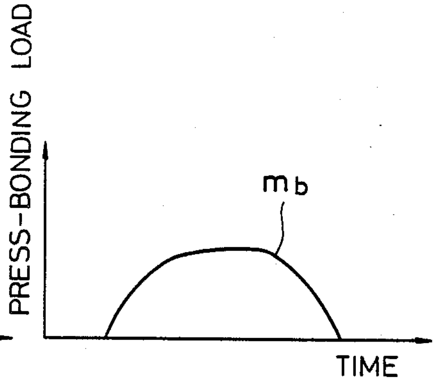

The respective press-bonding waveform patterns of the wire barrel and the insulation barrel are discriminated separately. FIGS. 17A and 17B show the detection signal waveform patterns of the press-bonding loads obtained when the respective press-bonding states of the barrels are both normal. In FIGS. 17A and 17B, the axis of abscissa represents the time (msec) elapsed during the change of the waveform, and the axis of ordinate represents the press-bonding load (kgf). FIG. 17A shows a detection signal waveform pattern ma of the normal press-bonding load of a wire barrel, while FIG. 17B shows a detection signal waveform pattern mb of the normal press-bonding load of a insulation barrel.

FIGS. 18A to 21A and 18B to 21B show the waveform patterns of the detection signals obtained when the press-bonding states are defective. If the terminal is a "split-cored" terminal such that some of the cores at the end of the wire are located outside the wire barrel, or if one or two out of seven cores, for example, are dislocated, a waveform pattern na is obtained as indicated by dotted line in FIG. 18A.

Figure 18A:
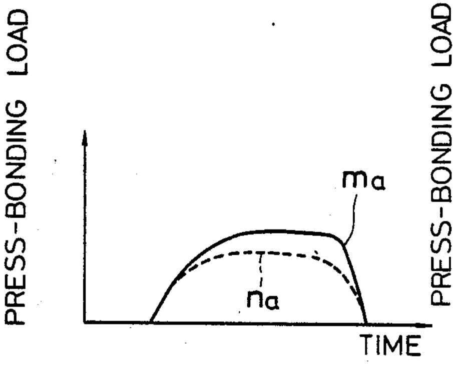

As seen from FIG. 18A, there is a substantial difference in peak level between the dotted-line waveform pattern na for the "split-cored" terminal, and the full-line detection signal waveform pattern ma, as a reference waveform pattern, of the normal press-bonding load of the wire barrel. Thus, whether the terminal "split-cored" or not can be determined with ease, and the dislocation of only one or two cores can be detected accurately.

Figure 18B:
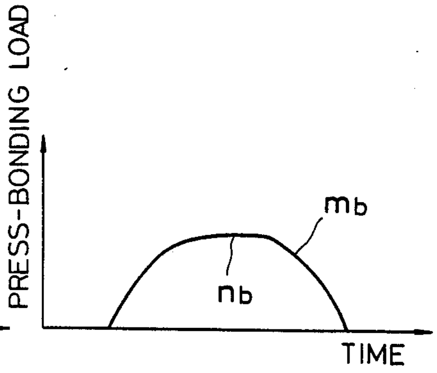

In this case, if the insulation barrel is normally press-bonded to the resin-coated portion, a detection signal waveform pattern nb of its press-bonding load is substantially coincident with the detection signal waveform pattern mb (FIG. 17B) of the normal press-bonding load of the insulation barrel, as shown in FIG. 18B.

Figure 19A:
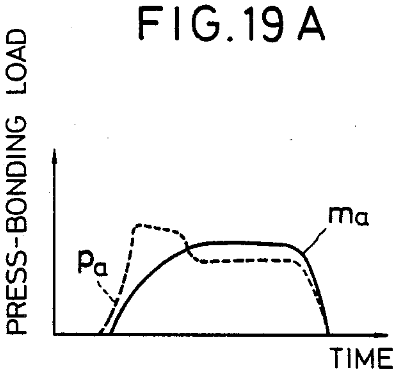

In the case of a "resin-engaged" terminal such that the wire barrel is press-bonded not to the cores but to the resin-coated portion, the press-bonding load of the wire barrel has a detection signal waveform pattern pa, as indicated by dotted line in FIG. 19A. As seen from FIG. 19A, the difference between the waveform pattern pa and the detection signal waveform pattern ma of the normal press-bonding load of the wire barrel is so marked that the "resin-engaged" terminal can be detected easily.

Figure 19B:
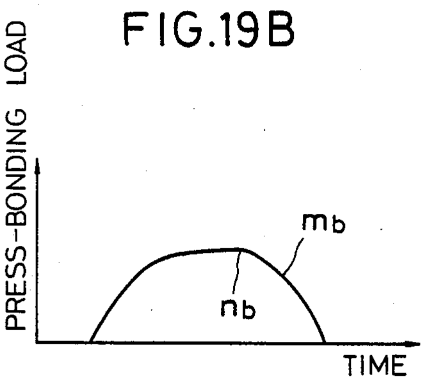

In this case, if the insulation barrel is normally press-bonded to the resin-coated portion, the detection signal waveform pattern nb of the press-bonding load of the insulation barrel is substantially coincident with the detection signal waveform pattern mb of the normal press-bonding load of the insulation barrel, as shown in FIG. 19B.

Figure 20A:
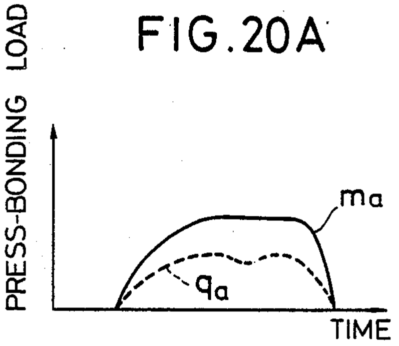
Figure 20B:
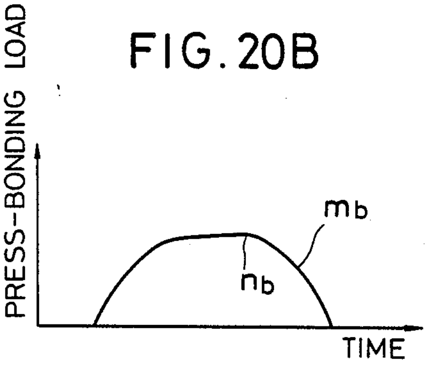

In the case of a "sunk-cored" terminal, the press-bonding load of the wire barrel has a detection signal waveform pattern qa, as indicated by dotted line in FIG. 20A. As seen from FIG. 20A, the difference between the waveform pattern qa and the detection signal waveform pattern ma of the normal press-bonding load of the wire barrel is so distinct that the "sunk-cored" terminal can be detected easily. Also in this case, the insulation barrel is press-bonded normally, and its detection signal waveform pattern nb is substantially coincident with the detection signal waveform pattern mb of the normal press-bonding load, as shown in FIG. 20B. The insulation barrel can be defective in the case of a "sunk-cored" terminal such that the ends of the cores W2 are dislocated from under the wire barrel T2 toward the insulation barrel T1. In this state, the insulation barrel T1 is press-bonded not to the end portion of the resin-coated portion W1 but to the cores W2. In this case, the press-bonding load of the insulation barrel has a detection signal waveform pattern nr, as indicated by dotted line in FIG. 21B.

Figure 21A:
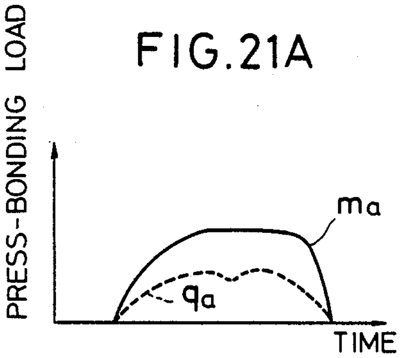
Figure 21B:
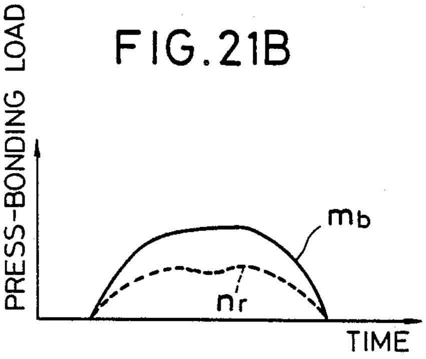

As seen from FIG. 21B, there is a great difference in peak level between the dotted-line waveform pattern nr and the detection signal waveform pattern mb of the normal press-bonding load of the insulation barrel. Thus, the "sunk-cored" terminal can be detected easily.

In this case, the wire barrel is also defective, and its press-bonding load has a detection signal waveform pattern qa, as indicated by dotted line in FIG. 21A. As described in connection with the dotted-line waveform pattern qa in FIG. 20A, the press-bonding defectiveness can be detected easily.

In this manner, the respective press-bonding states of the wire barrel and the insulation barrel of the terminal press-bonded to the end of the electric wire are detected. The waveform patterns of their detection signals are compared with their corresponding detection signal waveform patterns for the normal press-bonding states. Thus, whether the press-bonding load is normal or not is determined accurately and speedily. At the same time, the type of the press-bonding defectiveness, that is, whether the terminal concerned is "split-cored," "resin-engaged," or "sunk-cored," is determined. If any abnormality is detected, the abnormality discrimination signals are delivered from the discrimination circuits 20A and 20B.

The load sensors 30 and 35, which are used to detect the press-bonding loads of the wire barrel and the insulation barrel, may be attached to a wire barrel receiving portion and an insulation barrel receiving portion, respectively, of the terminal press-bonding table 3, instead of being mounted on the knife edges 5A and 5B, as mentioned before.

The method of the present invention is not limited to so-called side-feed terminals, and may be also applied to end-feed terminals.

Thus, it is possible not only to accurately detect the dislocation of only one or two cores, but also to discriminate the type of defectiveness. Consequently, the press-bonding defectiveness can be determined accurately and speedily.

In the embodiment described above, the sampling start points at which the sampling of the detection signals from the load sensors are started are determined by the levels of the signals from the sensors. In this case, if a trigger signal is produced by noises on the signal lines of the load sensors, a detection signal waveform n is stored in the memory with a time lag behind a reference signal waveform m for the normal press-bonding state, so that accurate determination cannot be effected. Such a situation may possibly be avoided by filtering the signal or raising the trigger level by means of the strain amplifier. However, if the amplified signal is smoothed, that is, if the high-frequency component of the signal is filtered so that the initial behavior is subject to variation, then that part of the signal corresponding to the filtered component cannot be obtained, according to the aforesaid countermeasure.

Thereupon, the influence of noises on the comparative discrimination of the waveform patterns for the defective terminals and those for the normal terminals can be eliminated by the following method.

As shown in FIG. 1, a press-bonding start sensor 50 is provided which serves to detect the time for the start of the terminal press-bonding operation by means of the press mechanism. The start time for the operation to press-bond the terminals T one by one to the respective ends of the wires, by means of the press mechanism, is coincident with the operation start time for the operating members of the press mechanism, for each stroke in which the press mechanism is reciprocated by means of the toggle unit 7. Accordingly, the start sensor 50 is located close to the operating members of the press mechanism.

In the example illustrated, a proximity sensor is used as the press-bonding start sensor 50. In this case, the sensor 50 is attached to the press frame 2 in a manner such that its head is situated opposite and close to the upper end portion of the ram 6, which serves as the operating member of the press mechanism. When the ram 6 starts lowering, in order to press-bond the terminal T to the end of the electric wire, the sensor 50 detects the start of the lowering action, thereby detecting the start time for the terminal press-bonding operation.

Figure 23:
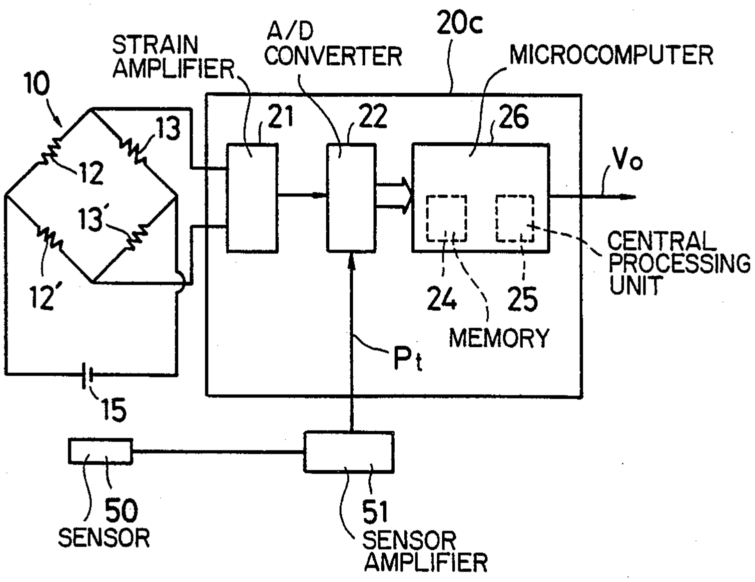
FIG. 23 is a block diagram showing the internal configuration of a pattern discrimination circuit having a sensor 50 for detecting the start of press-bonding operation.

FIG. 23 shows a configuration of the pattern discrimination circuit 20C using the proximity sensor 50. In FIG. 23, like reference numerals refer to substantially the same components as shown in FIG. 7, and a detailed description of these components is omitted herein. The proximity sensor 50 is connected electrically to a sensor amplifier 51, the output side of which is connected to the input side of the A/D converter 22 of the waveform pattern discrimination circuit 20C for the press-bonding load detection signal.

When a detection signal from the proximity sensor 50 is applied to the A/D converter 22, the converter 22 starts sampling the press-bonding load detection signal delivered from the bridge circuit of the load sensor 10 during the terminal press-bonding operation, on termination of a predetermined period of time after the input of the detection signal.

Figure 22:
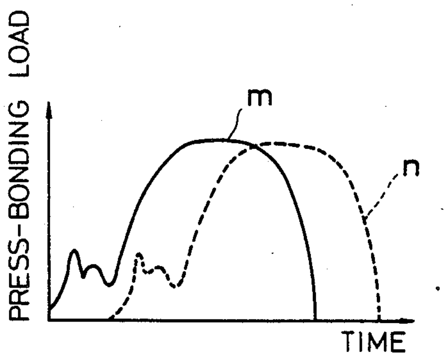
FIG. 22 is a graph showing press-bonding load signal waveforms read with different timings at the time of detection of the terminal press-bonding load.

The waveform pattern of the detection signal is compared with the waveform pattern of the normal press-bonding load, as mentioned before, whereby whether the press-bonding state of the terminal to be detected is normal is determined. In this case, the detection signal, indicative of the press-bonding state of the terminal concerned, cannot be delivered before the end of the predetermined period of time after the start of the press-bonding operation for the terminal is detected by the proximity sensor 50. Therefore, the signal is stable within this period, so that there will never be a situation such that the detection signal waveform n is stored in the memory with a time lag behind the reference signal waveform m for the normal press-bonding state, due to the noises on the signal lines of the load sensors, as shown in FIG. 22. Thus, the comparative discrimination can be effected accurately.

In the embodiment described above, the proximity sensor is used as the press-bonding start sensor. Alternatively, however, an ordinary limit switch may be used for the purpose. Instead of being situated close to the ram 6 of the press mechanism, moreover, the start sensor may be located so as to be able to detect the start time for the toggle or link operation.

According to the present embodiment, moreover, the load cell formed of a strain resistance element is used as the load sensor for detecting the reaction force acting on the ram 6 during the press-bonding operation. Alternatively, however, a load-to-electricity converter element, such as a piezoelectric transducer element, magnetic resistance element, electrostatic capacity element, etc., may be used for the purpose.

In the present embodiment, furthermore, the load sensor is attached to the ram 6. Alternatively, however, it may be attached to the link of the toggle unit or the pressing portion 5 of the applicator. In FIG. 1, a load sensor 10′ attached to the pressing portion 5 is indicated by broken line.

The method for detecting the molding defectiveness of a workpiece according to the present invention is not limited to the terminal press-bonding work for terminal-bonded wires, and may be also applied to the detection of molding defectiveness caused in various press-molding works.

Figure 24:
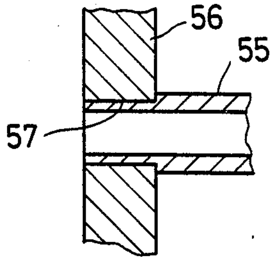
FIG. 24 is a partial sectional view showing a state such that a pipe is press-fitted into a support plate of a heat exchanger.

FIG. 24 shows a state such that a pipe 55 of a heat exchanger, for example, is press-fitted into a hole 57 which is bored through a support plate 56. When press-fitting the pipe 55 into the hole 57 by means of a press-fit device (not shown), the method of the present invention can be used in determining whether the pipe 55 is press-fitted normally.

Figure 25:
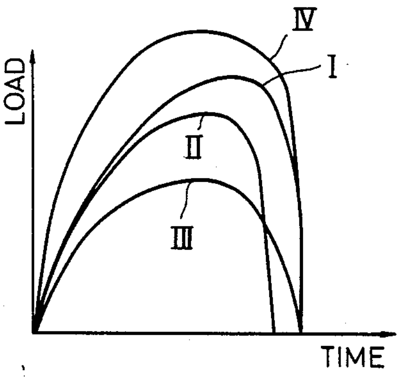
FIGS. 25, 26 and 27 are graphs schematically showing the patterns of various press-fit load signal waveforms detected when the pipe of the heat exchanger shown in FIG. 24 is press-fitted.
Figure 27:
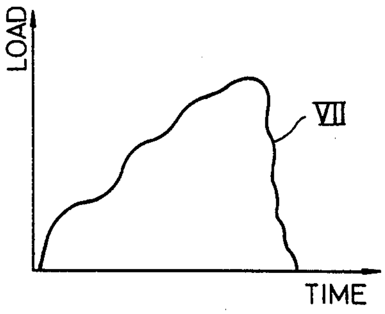

FIGS. 25 and 27 show time-based transitions of the press-fit load detected when the pipe 55 is press-fitted. In FIG. 25, curve I indicates a load profile obtained when the pipe 55 and the hole 57 are normal in shape and the like, and the pipe 55 is press-fitted properly in the hole 57.

Figure 26:
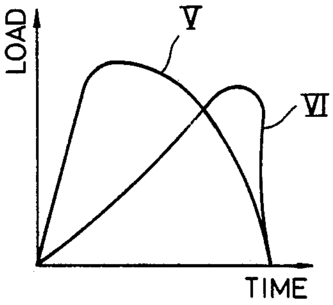

If the pipe 55 is subject to press-fit defectiveness, however, the load profile obtained is considerably different from the normal profile I. If the pipe 55 is inserted only into the middle portion of the hole 57, for example, such a press-fit load profile as is indicated by curve II of FIG. 25 is obtained. In this case, the period between the start and end of the press-fit operation is shorter than in the normal case. In FIG. 25, moreover, curves III and IV represent cases such that the engagement between the pipe 55 and the hole 57 is loose and tight, respectively. In the former case, the pipe 55 may possibly be disengaged or the heat medium may leak. In the latter case, the engaging portion of the pipe 55 may possibly be cracked so that the heat medium may leak through the cracked portion. In FIG. 26, curves V and VI are profiles indicative of cases such that the inlet side of the hole 57 is narrowed and expanded, respectively. Curve VII of FIG. 27 is a press-fit load profile for a case such that the surface of the hole 57 or the engaging portion of the pipe 55 is finished so poorly that it is uneven.

Since the profile varies depending on the press-fit mode of the pipe 5, the press-fit defectiveness and the defectiveness mode can be determined by detecting the press-fit load profile. The leakage of the heat medium and the cracking of the pipe can be prevented by removing the defective press-fitted pipe in accordance with the result of the determination.

Figure 28:
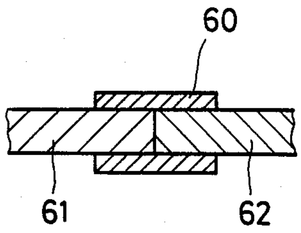
FIG. 28 is a partial sectional view showing the way conductors are connected by means of a sleeve.

FIG. 28 shows another example to which is applied the method of the present invention. In FIG. 28, the respective end portions of two conductors 61 and 62 are inserted into a sleeve 60 through two opposite ends thereof, individually. When fixedly connecting the conductors to each other by constricting (press-bonding) the outer peripheral wall of the sleeve 60, whether the connection of the conductors is defective or not is determined by the method of the present invention. In this case, an electrically conductive material, such as copper or aluminum, is used for the conductors 61 and 62 and the sleeve 60.

Figure 29:
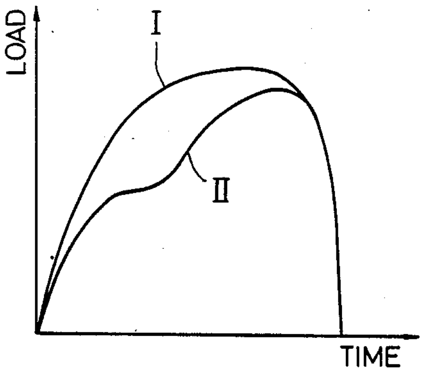
FIG. 29 is a graph schematically showing the patterns of press-bonding load signal waveforms detected when the sleeves shown in FIG. 28 are press-bonded.

If the outside diameter of the conductors 61 and 62 is so small, or if the inside diameter of the sleeve 60 is so large that there is a wide gap between them, the initial load to deform the sleeve 60 becomes smaller. Thus, when the sleeve 60 starts to touch the conductors 61 and 62, the load increases drastically. Such a load profile is indicated by curve II in FIG. 29, which is considerably different from a profile I for the normal case. Such a sleeve connection as may be indicated by the load profile II should be rejected as defective, since the frictional force between the sleeve 60 and the conductors 61 and 62 is small, and the conductors 61 and 62 are liable to be disengaged from the sleeve 60.

Figure 30:
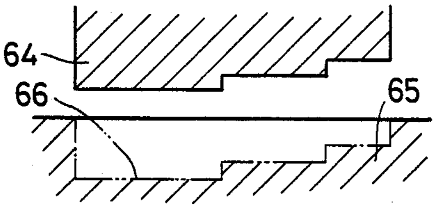
FIG. 30 is a partial sectional view showing a punch and a substrate to be press-marked.
Figure 31:
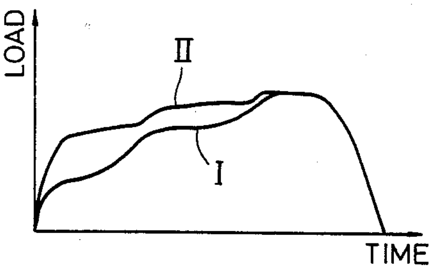
FIG. 31 is a graph schematically showing the patterns of press-bonding load signal waveforms detected when the punch shown in FIG. 30 is used for press-marking.

FIG. 30 shows an example in which the method of the present invention is applied to press-marking work. In FIG. 30, a punch 64 is pressed against a substrate 65 to form a groove 66 of a predetermined shape. In forming the groove 66 by press-marking, the depth of the groove usually is not uniform, and the size of the load acting on the punch 64 varies with the lapse of time, depending on the configurations of characters, signs, patterns, etc. In this case, if part of a striking face (projected face) of the punch 64 is subject to a defect, such as chipping, a load profile (curve II of FIG. 31) obtained when the defective punch is used for marking is extremely different from a load profile (curve I of FIG. 31) obtained with use of a nondefective punch. Thus, the defective punch, that is, the defectiveness of resulting moldings, can be detected by monitoring the load profile. Also, the location of the defect(s) on the striking face of the punch can be estimated from the load profile.

Figure 32:
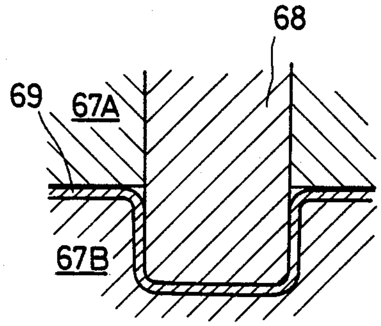
FIG. 32 is a partial sectional view showing a punch and a workpiece to be subjected to deep press-drawing.
Figure 33:
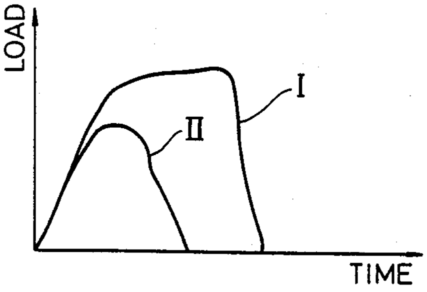
FIGS. 33 and 34 are graphs schematically showing the patterns of press-bonding load signal waveforms detected when the punch shown in FIG. 32 is used for deep press-drawing.
Figure 34:
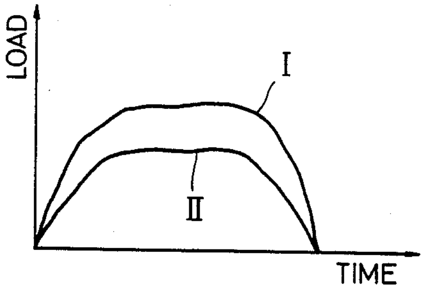

FIG. 32 shows an example in which the method of the present invention is applied to deep press-drawing work. In FIG. 32, a workpiece (sheet) 69, held between upper and lower dies 67A and 67B, is deeply drawn into the predetermined shape of a cup, dish or the like by means of a punch 68. In this case, if the workpiece is cracked or broken in the middle of the work, the load acting on the punch usually diminishes suddenly during the working process. Curve II of FIG. 33 is a load profile obtained when the workpiece 69 is subject to a defect, exhibiting a great difference from a profile I for the normal case. If the workpiece 69 is cracked, the punch 68 is depressed so quickly that the working time shortens and the maximum load is reduced. Such a working defectiveness can be also detected by monitoring the load profile. If the workpiece 69 is too thin, although it is neither cracked nor broken, the profile of the load on the punch 68, as indicated by curve II in FIG. 34, is much lower than a normal load profile I. In this case, although the working time is substantially the same as in the case of normal working, resulting moldings are often subject to wrinkling, and wrinkled products should be rejected as defectives.

Figure 35:
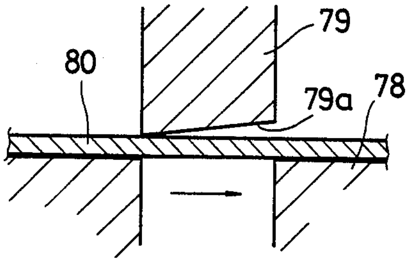
FIG. 35 is a partial sectional view showing a punch and a workpiece to be press-stamped.

FIG. 35 shows an example in which the method of the present invention is applied to press-stamping work. In FIG. 35, a hole corresponding in shape to a die 78 and a punch 79 is punched in a workpiece (sheet) 80. A bottom face 79*a* of the punch 79 is usually slanted so that the stamping force is smaller and the stamping work is easier. If the edge of the punch 79 and/or the die 78 is rounded by wearing, however, the stamping load increases, so that the cut surface is subject to burr, sag, irregularity, etc., and a desired shape cannot be obtained. Also in this case, the stamping defectiveness can be determined by detecting a stamping load profile, and the location of wear of the punch 79 and/or die 78 can be specified. In this example, the working advances in the direction indicated by the arrow in FIG. 35. If the initial load is too much greater than the normal load, then the left-hand edge of the die 78 or the punch 79, as illustrated, is defective, so that the workpiece may often be subject to a crack, burr, or warp at the portion corresponding in position to the left-hand edge of the die.

Figure 36:
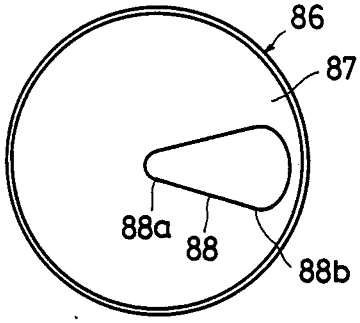
FIG. 36 is a plan view showing the end face of a can with a lid groove.

FIG. 36 shows a lid groove 88 marked on an end face 87 of a can 86, e.g., a beer can, by press-molding. In this grooving work, smaller and larger circle portions 88*a* and 88*b* of the groove 88 are formed deeper and shallower, respectively. In this case, as in the case of the press-marking work shown in FIG. 30, the load level increases with the lapse of time. Thus, the life of the punch and the grooving defectiveness can be determined by detecting a stamping load profile.

What is claimed is:

1. A method for detecting the molding defectiveness of a press-molded workpiece, comprising the steps of:

providing a reference time-based molding load profile;

detecting a time-based profile of a molding load acting on said workpiece during a press-molding operation;

comparing said detected molding load profile with said reference molding load profile; and determining the molding defectiveness of said workpiece in accordance with the result of said comparison.

2. A method for detecting the press-bonding defectiveness of a terminal which, including a wire barrel and an insulation barrel, is attached to the end of a covered wire so that said wire barrel and said insulation barrel are press-bonded to an exposed conductor portion of said covered wire, respectively, by press-molding, comprising the steps of:

providing a reference time-based molding load profile;

detecting a time-based profile of a press-bonding load acting on said terminal during a terminal press-bonding operation based on press-molding;

comparing said detected press-bonding load profile with said reference press-bonding load profile; and determining the press-bonding defectiveness of said terminal in accordance with the result of said comparison.

3. The method according to claim 2, further comprising calculating at integral value of said press-bonding load acting on said terminal on the basis of said detected press-bonding load profile; and determining the press-bonding defectiveness of said terminal by comparing said calculated integral value with a predetermined reference value.

4. The method according to claim 3, further comprising recording the value of said press-bonding load acting on said terminal at predetermined time intervals on the basis of said detected press-bonding load profile, and comparing a sum total of said recorded press-bonding load values with said reference value.

5. The method according to claim 2, further comprising recording a plurality of press-bonding load values at predetermined points of time on the basis of said detected press-bonding load profile; wherein said individual press-bonding load values are compared with predetermined reference values individually corresponding thereto; and wherein the press-bonding defectiveness of said terminal is determined in accordance with the individual results of said comparison.

6. The method according to claim 5, wherein the press-bonding defectiveness of said terminal is determined in accordance with said comparison results.

7. The method according to claim 2, wherein a press-bonding load value obtained at least at one predetermined point of time and the maximum press-bonding load value are recorded on the basis of said detected press-bonding load profile; said press-bonding load values at a plurality of predetermined points of time are compared with predetermined reference values individually corresponding thereto; and the press-bonding defectiveness of said terminal is determined in accordance with the individual results of said comparison.

8. The method according to claim 7, wherein the press-bonding defectiveness of said terminal is determined in accordance with said comparison results.

9. The method according to claim 2, wherein time-based profiles of press-bonding loads acting on said wire barrel and said insulation barrel during said press-molding are detected separately; said detected press-bonding load profiles are compared with said reference press-bonding load profiles individually corresponding thereto; and the press-bonding defectiveness of said terminal is determined in accordance with the individual results of said comparison.

10. The method according to claim 9, wherein the press-bonding defectiveness of said terminal is determined in accordance with said comparison results.

11. A terminal press-bonding apparatus wherein a terminal is placed on a terminal press-bonding table, and is press-molded by means of an applicator, which is driven by means of a drive unit, whereby said terminal is attached to the end of a covered wire so that a wire barrel and an insulation barrel of said terminal are press-bonded to an exposed conductor portion at the end of said covered wire and a covered portion of said covered wire, respectively, said apparatus comprising:

a coupling member disposed between said drive unit and said applicator and coupled directly to said applicator;

means for providing a reference time-based molding load profile;

sensor means for detecting a time-based profile of a press-bonding load acting on said terminal during a terminal press-bonding operation, said sensor means being attached to said coupling member; and discrimination circuit means for comparing said press-bonding load profile detected by said sensor means with said reference press-bonding load profile, and for determining the press-bonding defectiveness of said terminal in accordance with the result of said comparison.

12. The terminal press-bonding apparatus according to claim 11, wherein said coupling means includes a neck portion narrower in cross-sectional area than any other portion thereof, said sensor means being attached to said neck portion.

13. The terminal press-bonding apparatus according to claim 11, which further comprises trigger means for detecting a point of time for a start of a press-bonding operation by means of said applicator, and for delivering a trigger signal; and wherein said discrimination circuit means starts reading the press-bonding load profile, detected by said sensor means, on termination of a predetermined period of time after the delivery of said trigger signal from said trigger means.

14. For a molding apparatus used to press-mold a workpiece in such a way that it is subject to being defective due to a plurality of types of defectiveness, a method for determining that the press-molded workpiece is defective and for identifying the type of defectiveness, comprising the steps of:

detecting a time-based profile of a molding load acting on said workpiece during a press-molding operation;

providing a reference time-based molding load profile;

comparing said detected molding load profile with the reference molding load profile; and determining that the press-molded workpiece is defective and the type of defectiveness from the result of said comparison.

15. The method according to claim 14, further comprising calculating an integral value of the load acting on said workpiece on the basis of said detected molding load profile; and determining the type defectiveness of said workpiece by comparing said calculated integral value with a predetermined reference value.

16. The method according to claim 14, further comprising recording a plurality of molding values at predetermined points of time on the basis of said detected molding load profile; comparing said individual load values with predetermined reference values individually corresponding thereto; and determining the type of defectiveness of said workpiece in accordance with the individual results of said comparison.

17. The method according to claim 14, wherein said workpiece is a terminal adapted to be attached to an end of a covered wire so that a wire barrel and an insulation barrel of said terminal are press-bonded to an exposed conductor at the end of said covered wire and a covered portion of said covered wire, wherein said detected molding load profile comprises time-based profiles of press-bonding loads acting on said wire barrel and said insulation barrel during said press-molding which are detected separately; said detected press-bonding load profiles are compared with said reference values comprising reference press-bonding load profiles individually corresponding thereto; and the type of press-bonding defectiveness of said terminal is determined in accordance with the individual results of said comparison.

18. In a molding apparatus used to press-mold a workpiece in such a way that it is subject to being defective due to a plurality of types of defectiveness, an apparatus for determining that the press-molded workpiece is defective and for identifying the type of defectiveness, comprising:

means for detecting a time-based profile of a molding load acting on said workpiece during a press-molding operation;

means for providing a reference time-based molding load profile;

means for comparing said detected molding load profile with the reference molding load profile; and means for determining that the press-molded workpiece is defective and the type of defectiveness from the result of said comparison.

19. The apparatus according to claim 18, further comprising means for calculating an integral value of the load acting on said workpiece on the basis of said detected molding load profile; and means for determining the type of defectiveness of said workpiece by comparing said calculated integral value with a predetermined reference value.

20. The apparatus according to claim 18, further comprising means for recording a plurality of molding load values at predetermined points of time on the basis of said detected molding load profile; means for comparing said individual molding load values with predetermined reference values individually corresponding thereto; and wherein the determining means determines the type of defectiveness of said workpiece in accordance with the individual results of said comparison.

21. The apparatus according to claim 18, wherein said workpiece is a terminal adapted to be attached to an end of a covered wire so that a wire barrel and an insulation barrel of said terminal are press-bonded to an exposed conductor at the end of said covered wire and a covered portion of said covered wire, wherein said detecting means separately detects time-based profiles of press-bonding loads acting on said wire barrel and said insulation barrel during said press-molding; means for comparing said detected press-bonding load profiles with said reference values comprising reference press-bonding load profiles individually corresponding thereto; and the determining means determines the type of press-bonding defectiveness of said terminal in accordance with the individual results of said comparison.

22. For a molding apparatus used to press-mold a workpiece in such a way that it is subject to being defective due to a plurality of types of defectiveness, a method for determining that the press-molded workpiece is defective and for identifying the degree of defectiveness, comprising the steps of:

detecting a time-based profile of a molding load acting on said workpiece during a press-molding operation;

providing a reference time-based molding load profile;

comparing said detected molding load profile with the reference molding load profile; and determining that the press-molded workpiece is defective and the degree of defectiveness from the result of said comparison.

23. The method according to claim 22, wherein the maximum molding load value is determined on the basis of said detected molding load profile; and the degree of defectiveness of said workpiece is determined in accordance with the maximum molding load value.

24. In a molding apparatus used to press-mold a workpiece in such a way that it is subject to being defective due to a plurality of types of defectiveness, an apparatus for determining that the press-molded workpiece is defective and for identifying the degree of defectiveness, comprising:

means for detecting a time-based profile of a molding load acting on said workpiece during a press-molding operation;

means for providing a reference time-based molding load profile;

means for comparing said detected molding load profile with the reference molding load profile; and means for determining that the press-molded workpiece is defective and the degree of defectiveness from the result of said comparison.

25. The apparatus according to claim 24, wherein said determining means includes means for identifying the maximum molding load value on the basis of said detected molding load profile; and the determining means determines the degree of defectiveness of said workpiece in accordance with the identified maximum molding load value.

* * * * *